United States Patent
Kashihara et al.

(10) Patent No.: US 12,471,602 B2
(45) Date of Patent: Nov. 18, 2025

(54) MEAT-ATTACHED MATTER REMOVAL DEVICE AND MEAT-ATTACHED MATTER REMOVAL METHOD

(71) Applicant: MAYEKAWA MFG. CO., LTD., Tokyo (JP)

(72) Inventors: Naoya Kashihara, Tokyo (JP); Motomasa Tanaka, Tokyo (JP); Shinji Hane, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/696,756

(22) PCT Filed: Sep. 29, 2022

(86) PCT No.: PCT/JP2022/036347
§ 371 (c)(1),
(2) Date: Mar. 28, 2024

(87) PCT Pub. No.: WO2023/063092
PCT Pub. Date: Apr. 20, 2023

(65) Prior Publication Data
US 2024/0397960 A1    Dec. 5, 2024

(30) Foreign Application Priority Data
Oct. 11, 2021  (JP) .................................. 2021-166781

(51) Int. Cl.
A22C 21/00    (2006.01)
(52) U.S. Cl.
CPC ................................ *A22C 21/0076* (2013.01)

(58) Field of Classification Search
CPC .................................................. A22C 21/0076
(Continued)

(56) References Cited

U.S. PATENT DOCUMENTS 4,359,807 A * 11/1982 Adkison .............. A22C 21/066
 452/172
4,993,113 A * 2/1991 Hazenbroek ....... A22C 21/0076
 452/167

(Continued)

FOREIGN PATENT DOCUMENTS

CN  112720624 A  4/2021
JP  H02-012541 B2  3/1990
(Continued)

OTHER PUBLICATIONS

International Search Report Issued in PCT Application No. PCT/JP2022/036347, dated Nov. 15, 2022. (4 Pages with English Translation).

(Continued)

*Primary Examiner* — Richard T Price, Jr.
(74) *Attorney, Agent, or Firm* — Osha Bergman Watanabe & Burton LLP

(57) ABSTRACT

A meat-attached matter removal device includes a pair of gripping arms, an arm driving unit, and a circular blade body. The pair of gripping arms grip a base of an attached matter, which is attached to a chicken thigh meat, from both sides and raises the attached matter from the chicken thigh meat. The arm driving unit drives the pair of gripping arms. The circular blade body passes over the pair of gripping arms to cut the attached matter raised by the pair of gripping arms from the base of the attached matter.

23 Claims, 14 Drawing Sheets

(58) Field of Classification Search
USPC .......................................................... 452/135
See application file for complete search history.

(56) References Cited

U.S. PATENT DOCUMENTS

| | | | | |
|---|---|---|---|---|
| 5,203,736 | A | * | 4/1993 | Schulte .............. A22C 21/0076 |
| | | | | 452/136 |
| 5,401,210 | A | * | 3/1995 | Manmoto .......... A22C 21/0076 |
| | | | | 452/136 |
| 5,462,477 | A | * | 10/1995 | Ketels .................... A22C 17/04 |
| | | | | 269/22 |
| 6,027,404 | A | * | 2/2000 | Wols .................. A22C 21/0076 |
| | | | | 452/138 |
| 2003/0114097 | A1 | | 6/2003 | Markert et al. |
| 2013/0114097 | A1 | * | 5/2013 | Kakuta .............. H04N 1/00745 |
| | | | | 358/1.13 |
| 2013/0137353 | A1 | * | 5/2013 | Landt ................. A22C 21/0023 |
| | | | | 452/149 |

FOREIGN PATENT DOCUMENTS

| | | |
|---|---|---|
| JP | H05-009052 B2 | 2/1993 |
| JP | H05-076288 U | 10/1993 |
| JP | 2013-507101 A | 3/2013 |
| JP | 2019-110830 A | 7/2019 |
| JP | 2019-208438 A | 12/2019 |
| JP | 2021-511059 A | 5/2021 |
| WO | 2005053412 A1 | 6/2005 |
| WO | 2011-121899 A1 | 10/2011 |
| WO | 2019-149746 A1 | 8/2019 |

OTHER PUBLICATIONS

Office Action Issued in Corresponding Taiwanese Application No. 111137793, dated Sep. 6, 2023. (8 Pages).
Office Action issued in counterpart Japanese Patent Application No. 2023-555095 mailed Oct. 1, 2024 (9 pages).
Supplementary European Search Report issued in Corresponding EP Application No. 22880788.9, dated Jul. 23, 2025 (5 Pages).

* cited by examiner

MEAT-ATTACHED MATTER REMOVAL DEVICE AND MEAT-ATTACHED MATTER REMOVAL METHOD

TECHNICAL FIELD

The present invention relates to a meat-attached matter removal device and a meat-attached matter removal method.

Priority is claimed on Japanese Patent Application No. 2021-166781, filed Oct. 11, 2021, the content of which is incorporated herein by reference.

BACKGROUND ART

In order to advance the process from manual processing to automated processing using machines in the process of dissecting poultry carcasses such as chickens, an automatic deboning device for deboning bone-in chicken leg meat has been disclosed (for example, see Patent Document 1). This device intermittently conveys bone-in chicken leg meats between multiple processing stations while suspending them from clamp devices. Automatic deboning is enabled by sequentially performing steps such as incision-making in a bone-in chicken leg meats and separating bone and meat at each station.

The bone-in chicken leg meat has a knee joint and a cartilage is attached to the knee joint. When dissecting the bone-in chicken leg meat, it is necessary to select whether to attach the cartilage to the chicken thigh meat or to attach the cartilage to the bone depending on the needs of the processor. A technique of efficiently switching such selections without relying on human hands by simply conveying bone-in chicken leg meats along a conveying route has been disclosed (for example, see Patent Document 2).

Since the cartilage itself has a commercial value, the cartilage is removed from the chicken thigh meat or bone even in any case in which the cartilage is attached to the chicken thigh meat and the cartilage is attached to the bone. Since it requires skill when removing the cartilage from the bone, the cartilage is often removed from the chicken thigh meat which is easier to remove than from the bone. Since the process of removing the cartilage from the chicken thigh meat is also advanced from manual processing to automated processing using machines, various techniques have been disclosed.

For example, a technique of conveying a deboned chicken thigh meat while placing the meat on a tray device attached to a conveyor, pinching a cartilage part of the chicken thigh meat between a capture member of a leg member and a plate of the tray, and moving the leg member together with the conveyor using a cylinder has been disclosed (for example, see Patent Document 3). Then, the cartilage is passed through a wedge-shaped opening in a jaw device and a meat part is scraped off and placed in a container on the conveyor. The cartilage is released from the leg member and is dropped into the container when reversing the conveyor.

CITATION LIST

Patent Document

[Patent Document 1] Published Japanese Translation No. 2013-507101

[Patent Document 2] Japanese Unexamined Patent Application, First Publication No. 2019-110830

[Patent Document 3] Japanese Examined Patent Application, Second Publication No. H2-12541

SUMMARY OF INVENTION

Technical Problem

When the cartilage is removed from the chicken thigh meat while the cartilage is attached to the chicken thigh meat, contamination of foreign matter may occur when the cartilage is not completely removed from the meat. In addition to the cartilage, the attached matter to the chicken thigh meat can be considered as contamination of foreign material. If a large amount of the meat around the cartilage is scraped off when removing the cartilage (the attached matter) from the chicken thigh meat, a hole will be formed on the meat side. When this hole is large, the commercial value of the chicken thigh meat will decrease.

As in Patent Document 3 described above, when there is an attempt to simply scrape off the chicken thigh meat from the cartilage, there is a possibility that a large amount of the meat around the cartilage will also be scraped off. Therefore, there is a problem that the commercial value of the chicken thigh meat will decrease.

An object of the present invention is to provide a meat-attached matter removal device and a meat-attached matter removal method capable of improving a commercial value of a meat while automating a process of removing an attached matter attached to a deboned meat.

Solution to Problem

In order to achieve the aforementioned objects, according to Aspect 1 of the present invention, there is provided a meat-attached matter removal device including: a pair of gripping arms that is configured to grip an attached matter, which is attached to a deboned meat, from both sides of the attached matter and from a base of the attached matter at a side of the meat and that is configured to raise the attached matter from the meat; a driving unit configured to drive the pair of gripping arms; and a cutter that passes over the pair of gripping arms and that is configured to cut the attached matter raised by the pair of gripping arms from the base of the attached matter at the side of the meat.

In this way, since the base of the attached matter is cut by the cutter after the attached matter is raised by the pair of gripping arms, it is possible to suppress as much as possible the meat around the attached matter from remaining on the side of the attached matter when removing the attached matter from the meat by the cutter. Therefore, it is possible to improve the commercial value of the meat while automating the process of removing the attached matter attached to the deboned meat.

According to Aspect 2 of the present invention, in the meat-attached matter removal device according to Aspect 1 of the present invention, the driving unit may include a contact/separation driving unit configured to make the pair of gripping arms to approach and separate from the meat and an opening/closing driving unit configured to perform an open and close movement of the pair of gripping arms by approaching and separating the pair of gripping arms from each other.

With such a configuration, it is possible to grip the attached matter by the pair of gripping arms with a simple structure and to further raise the attached matter from the meat.

According to Aspect 3 of the present invention, in the meat-attached matter removal device according to Aspect 2 of the present invention, the driving unit may include a rotation driving unit configured to rotate the pair of gripping arms around a center axis which is a direction in which the pair of gripping arms approach and separate with respect to the meat.

With such a configuration, it is possible to change the orientation of the pair of gripping arms with respect to the attached matter. By changing the orientation of the pair of gripping arms, it is possible to easily grip the attached matter by these gripping arms from both sides.

According to Aspect 4 of the present invention, in the meat-attached matter removal device according to any one of Aspects 1 to 3 of the present invention, the pair of gripping arms may extend from the driving unit in a direction intersecting a gripping direction, and at least one of the pair of gripping arms may be provided with a convex portion which is provided at a tip of the gripping arm so as to prevent a gripping mistake of the attached matter by the gripping arms.

With such a configuration, it is possible to prevent the attached matter gripped by the pair of gripping arms from escaping from the tips of these gripping arms. Therefore, it is possible to prevent a gripping mistake of the attached matter by the pair of gripping arms and to reliably grip the attached matter by the pair of gripping arms.

According to Aspect 5 of the present invention, in the meat-attached matter removal device according to any one of Aspects 1 to 4 of the present invention, the convex portion may be provided in a first gripping arm which is one of the pair of gripping arms and extend in the gripping direction from a tip of the first gripping arm toward a second gripping arm which is other one of the pair of gripping arms, a connecting portion between the first gripping arm and the convex portion may be curved along a shape of the attached matter, and a tip of the second gripping arm may be curved along a shape of the connecting portion so that the tip of the second gripping arm overlaps the connecting portion in an approach/separation direction of the pair of gripping arms and follows the connecting portion in a state the pair of gripping arms have approached with each other.

With such a configuration, it is possible to raise only the attached matter by the pair of gripping portions. By the pair of gripping portions, it is possible to suppress the meat around the attached matter from rising upward together with the attached matter.

According to Aspect 6 of the present invention, in the meat-attached matter removal device according to Aspect 5 of the present invention, the connecting portion may be formed in a linear shape so as to straddle the first gripping arm and the convex portion and may be formed so as to incline with respect to an extension direction of the first gripping arm and an extension direction of the convex portion.

With such a configuration, it is possible to easily allow the connecting portion to follow the attached matter. Therefore, it is possible to more reliably raise only the attached matter by the pair of gripping portions.

According to Aspect 7 of the present invention, in the meat-attached matter removal device according to Aspect 5 of the present invention, the meat may be a chicken thigh meat and the attached matter may be a cartilage and a fat body attached to the cartilage. Then, the pair of gripping arms may be arranged so that the pair of gripping arms is located between an ankle side of the chicken thigh meat and a groin side of the chicken thigh meat which are located on both sides in the gripping direction, and the connecting portion may be curved so that a side closer to the groin side of the chicken thigh meat protrudes.

With such a configuration, it is possible to allow the connecting portion to more easily follow the attached matter. Therefore, it is possible to more reliably raise only the attached matter by the pair of gripping portions.

According to Aspect 8 of the present invention, in the meat-attached matter removal device according to Aspects 1 to 7 of the present invention, the pair of gripping arms may extend from the driving unit in a direction intersecting a gripping direction, and the meat-attached matter removal device may further include an arm escape prevention portion that is provided at a side of a base end of the gripping arm and that is configured to prevent an escape of the attached matter from the base end of the gripping arm.

With such a configuration, it is possible to prevent the attached matter gripped by the pair of gripping arms from escaping from the base ends of these gripping arms. Therefore, it is possible to prevent a gripping mistake of the attached matter by the pair of gripping arms and to reliably grip the attached matter by the pair of gripping arms.

According to Aspect 9 of the present invention, in the meat-attached matter removal device according to Aspects 1 to 8 of the present invention, the pair of gripping arms may extend from the driving unit in a direction intersecting a gripping direction, and at least one of the pair of gripping arms may be provided with a cutter escape prevention portion that is arranged with a gap on a side opposite to a side of the gripping arm in which the meat is disposed and that is configured to prevent an escape of the attached matter from the cutter when cutting the attached matter from the meat.

With such a configuration, it is possible to prevent the attached matter cut by the cutter from scattering.

According to Aspect 10 of the present invention, in the meat-attached matter removal device according to Aspects 1 to 9 of the present invention, the pair of gripping arms may extend from the driving unit in a direction intersecting a gripping direction, and widening portions may be formed at base ends of the pair of gripping arms so that a gap between the pair of gripping arms becomes wider towards outer side in a longitudinal direction of the gripping arm.

With such a configuration, it is possible to prevent a narrow gap between these gripping arms at the base ends of the pair of gripping arms when gripping the attached matter by the pair of gripping arms. In other words, it is possible to ensure a gap between these gripping arms at the base ends of the pair of gripping arms when gripping the attached matter by the pair of gripping arms. Therefore, it is possible to prevent the meat from being pinched by the base ends of the gripping arms at the same time when the attached matter is gripped by the pair of gripping arms. Thus, it is possible to prevent the meat from being damaged by the gripping arm and to further improve the commercial value of the meat.

According to Aspect 11 of the present invention, in the meat-attached matter removal device according to Aspects 1 to 10 of the present invention, the pair of gripping arms may extend from the driving unit in a direction intersecting a gripping direction, and crank portions, which is bent so as to be separated toward a side opposite to a side the meat is placed, may be provided at base ends of the pair of gripping arms.

With such a configuration, it is possible to separate the base ends of the pair of gripping arms from the meat. Therefore, it is possible to prevent the meat from being pinched by the base ends of the gripping arms at the same time when the attached matter is gripped by the pair of gripping arms. Thus, it is possible to prevent the meat from being damaged by the gripping arm and to further improve the commercial value of the meat.

According to Aspect 12 of the present invention, in the meat-attached matter removal device according to any one of Aspects 1 to 11 of the present invention, the pair of gripping arms may extend from the driving unit in a direction intersecting a gripping direction, and a cross-sectional shape of the pair of gripping arms in a shorter side direction may include a first arcuate surface formed between a meat arrangement side and a side opposite to a mutually facing side of the pair of gripping arms, a first vertical wall surface extending from an end of the first arcuate surface at the mutually facing side of the pair of gripping arms toward a side opposite to the meat arrangement side, a first upper wall surface extending from an end of the first arcuate surface at a side opposite to the meat arrangement side toward the mutually facing side of the pair of gripping arms, and a first inclined surface connecting the first vertical wall surface and the first upper wall surface and inclined so that a distance between the pair of gripping arms becomes shorter as it goes from the first upper wall surface toward the first vertical wall surface.

With such a configuration, because of the first arcuate surface, it is possible to prevent the meat from being damaged when pressing the pair of gripping arms against the meat. When pinching (gripping) the attached matter by the pair of gripping arms, it is possible to easily raise the attached matter onto the pair of gripping arms by the upper wall surface and the inclined surface. By placing the cutter along the vicinity of the upper wall surface, the attached matter can be removed without remaining the meat around the attached matter on the side of the attached matter as much as possible.

According to Aspect 13 of the present invention, in the meat-attached matter removal device according to any one of Aspects 1 to 11 of the present invention, the pair of gripping arms may extend from the driving unit in a direction intersecting a gripping direction, a cross-sectional shape of the pair of gripping arms in a shorter side direction may include a second arcuate surface formed between a meat arrangement side and a side opposite to a mutually facing side of the pair of gripping arms, a second inclined surface extending from an end of the second arcuate surface at the mutually facing side of the pair of gripping arms toward a side opposite to the meat arrangement side, a second upper wall surface extending from an end of the second arcuate surface at a side opposite to the meat arrangement side toward the mutually facing side of the pair of gripping arms, and a second vertical wall surface connecting the second inclined surface and the second upper wall surface, each of the second inclined surface may be inclined so that a distance between the pair of gripping arms becomes shorter as it goes from an end of the second arcuate surface toward an end of the second vertical wall surface, and, in a cross-sectional shape of the pair of gripping arms in the shorter side direction, a length of the second inclined surface may be longer than a length of the second vertical wall surface.

With such a configuration, because of the second arcuate surface, it is possible to prevent the meat from being damaged when pressing the pair of gripping arms against the meat. When pinching (gripping) the attached matter by the pair of gripping arms, it is possible to reliably raise the attached matter onto the second upper wall surface. By placing the cutter along the vicinity of the second upper wall surface, the attached matter can be removed without remaining the meat around the attached matter on the side of the attached matter as much as possible.

According to Aspect 14 of the present invention, the meat-attached matter removal device according to any one of Aspects 1 to 13 of the present invention may further include: an auxiliary cutter configured to cut the attached matter from the meat, a cutting direction of the auxiliary cutter may intersect a cutting direction of the cutter, and the auxiliary cutter may be disposed at a position in which the attached matter is cut from the meat by the auxiliary cutter and the cutter while the attached matter passes through between the auxiliary cutter and the cutter.

With such a configuration, it is possible to more reliably cut the attached matter from the meat by the auxiliary cutter.

According to Aspect 15 of the present invention, in the meat-attached matter removal device according to Aspect 14 of the present invention, the auxiliary cutter may be disposed at a position in which the auxiliary cutter cuts the attached matter from the meat earlier than the cutter.

With such a configuration, it is possible to cut the meat by the cutter after making an incision in the meat by the auxiliary cutter. Therefore, it is possible to more reliably cut the attached matter.

According to Aspect 16 of the present invention, the meat-attached matter removal device according to Aspect 14 or 15 of the present invention may further include: a rising prevention portion configured to prevent a part in the attached matter raised by the pair of gripping arms and which will be cut by the auxiliary cutter from rising, and the rising prevention portion may be arranged so that the cutter is able to pass between the gripping arm and the rising prevention portion and so that the auxiliary cutter is able to pass close to a side surface of the rising prevention portion at a side opposite to a side in which the cutter cuts into the meat.

With such a configuration, it is possible to prevent the auxiliary cutter from making an insufficient incision in the meat when the meat escapes from the auxiliary cutter.

According to Aspect 17 of the present invention, in the meat-attached matter removal device according to any one of Aspects 1 to 16 of the present invention, the cutter may include a circular blade cutter which rotates around a cutter axis, the meat-attached matter removal device may further include a scattering prevention wall that is provided on a downstream side of a cutting position of the cutter with respect to the meat in a rotation direction of the cutter and that is configured to prevent the attached matter from scattering, and the scattering prevention wall may be disposed to form a gap between the scattering prevention wall and the cutter so that the attached matter falls.

With such a configuration, it is possible to reliably cut the meat by the circular blade cutter. By the scattering prevention wall, it is possible to prevent the attached matter removed from the meat by the rotation of the circular blade cutter from scattering. Thus, it is possible to reliably discharge the attached matter from between the scattering prevention wall and the circular blade cutter.

According to Aspect 18 of the present invention, in the meat-attached matter removal device according to any one of Aspects 1 to 17 of the present invention, the attached matter may be a cartilage and a fat body attached to the cartilage.

In this way, the meat-attached matter removal device can be suitably used when removing the cartilage and the fat body attached to the cartilage from the meat.

According to Aspect 19 of the present invention, there is provided a meat-attached matter removal method of removing the attached matter from the meat using the above-described meat-attached matter removal device including: a pressing step of pressing the pair of gripping arms against the meat from both sides of the attached matter so that a constant pressure is applied to the meat; a raising step of gripping the base of the attached matter at the side of the meat and raises the attached matter from the meat by the pair of gripping arms, after the pressing step; and a cutting step of cutting the attached matter from the base of the attached matter at the side of the meat by the cutter, after the raising step.

By using such a method, it is possible to raise the attached matter from the meat by these gripping arms when gripping the attached matter by the pair of gripping arms. Then, since the base of the attached matter is cut by the cutter, it is possible to suppress as much as possible the meat around the attached matter from remaining on the side of the attached matter when removing the attached matter from the meat. Therefore, it is possible to improve the commercial value of the meat while automating the process of removing the attached matter attached to the deboned meat.

According to Aspect 20 of the present invention, there is provided a meat-attached matter removal method of removing the attached matter from the meat using the meat-attached matter removal device according to Aspect 14 of the present invention including: a pressing step of pressing the pair of gripping arms against the meat from both sides of the attached matter so that a constant pressure is applied to the meat; a raising step of gripping the base of the attached matter at the side of the meat and raises the attached matter from the meat by the pair of gripping arms, after the pressing step; and a cutting step of cutting the attached matter from the base of the attached matter at the side of the meat by the cutter and the auxiliary cutter, after the raising step.

By using such a method, it is possible to reliably remove the attached matter from the meat thanks to the auxiliary cutter.

According to Aspect 21 of the present invention, the meat-attached matter removal method according to Aspect 19 or 20 of the present invention may further include a lifting step of lifting the attached matter by the pair of gripping arms between the raising step and the cutting step.

By using such a method, the meat other than the attached matter gripped by the pair of gripping arms sags due to the own weight. As a result, it is possible to further suppress the meat around the attached matter from remaining on the side of the attached matter.

According to Aspect 22 of the present invention, in the meat-attached matter removal method according to any one of Aspects 19 to 21 of the present invention, the pair of gripping arms may extend from the driving unit in a direction intersecting a gripping direction, the meat may be a chicken thigh meat, and the attached matter may be a cartilage and a fat body attached to the cartilage. Then, the meat-attached matter removal method may further include a gripping arm orientation adjusting step of adjusting an orientation of the pair of gripping arms so that the pair of gripping arms is located between an ankle side of the chicken thigh meat and a groin side of the chicken thigh meat are located on both sides in the gripping direction, before the pressing step.

By using such a method, it is possible to easily grip the attached matter by the pair of gripping arms.

According to Aspect 23 of the present invention, in the meat-attached matter removal method according to Aspect 22 of the present invention, in the gripping arm orientation adjusting step, a distance between the attached matter and the gripping arm located on the ankle side of the chicken thigh meat among the pair of gripping arms may be shorter than a distance between the attached matter and the gripping arm located on the groin side of the chicken thigh meat among the pair of gripping arms when viewed from a side opposite to the chicken thigh meat with respect to the pair of gripping arms.

In the line direction connecting the ankle side and the groin side of the chicken thigh meat (hereinafter, referred to as the stature direction of the chicken thigh meat), the shape of the cartilage in the attached matter is not symmetrical with respect to the fat body. In other words, the shape of the cartilage is shifted to the groin side with respect to the fat body in the stature direction of the chicken thigh meat. Therefore, it is possible to ensure a large space between the attached matter and the gripping arm on the cartilage side compared to the center of the attached matter by using the above-described method. As a result, it is possible to reliably prevent the pair of gripping arms from pressing down on a particularly hard part of the attached matter, that is, the cartilage during the pressing step.

Advantageous Effects of Invention

According to the meat-attached matter removal device and the meat-attached matter removal method described above, it is possible to suppress as much as possible the meat around the attached matter from remaining on the side of the attached matter when removing the attached matter from the meat by the cutter. Therefore, it is possible to improve the commercial value of the meat while automating the process of removing the attached matter attached to the deboned meat.

DESCRIPTION OF EMBODIMENTS

Next, embodiments of the present invention will be described with reference to the drawings.

First Embodiment

<Meat-Attached Matter Removal Device>

Figure 1:
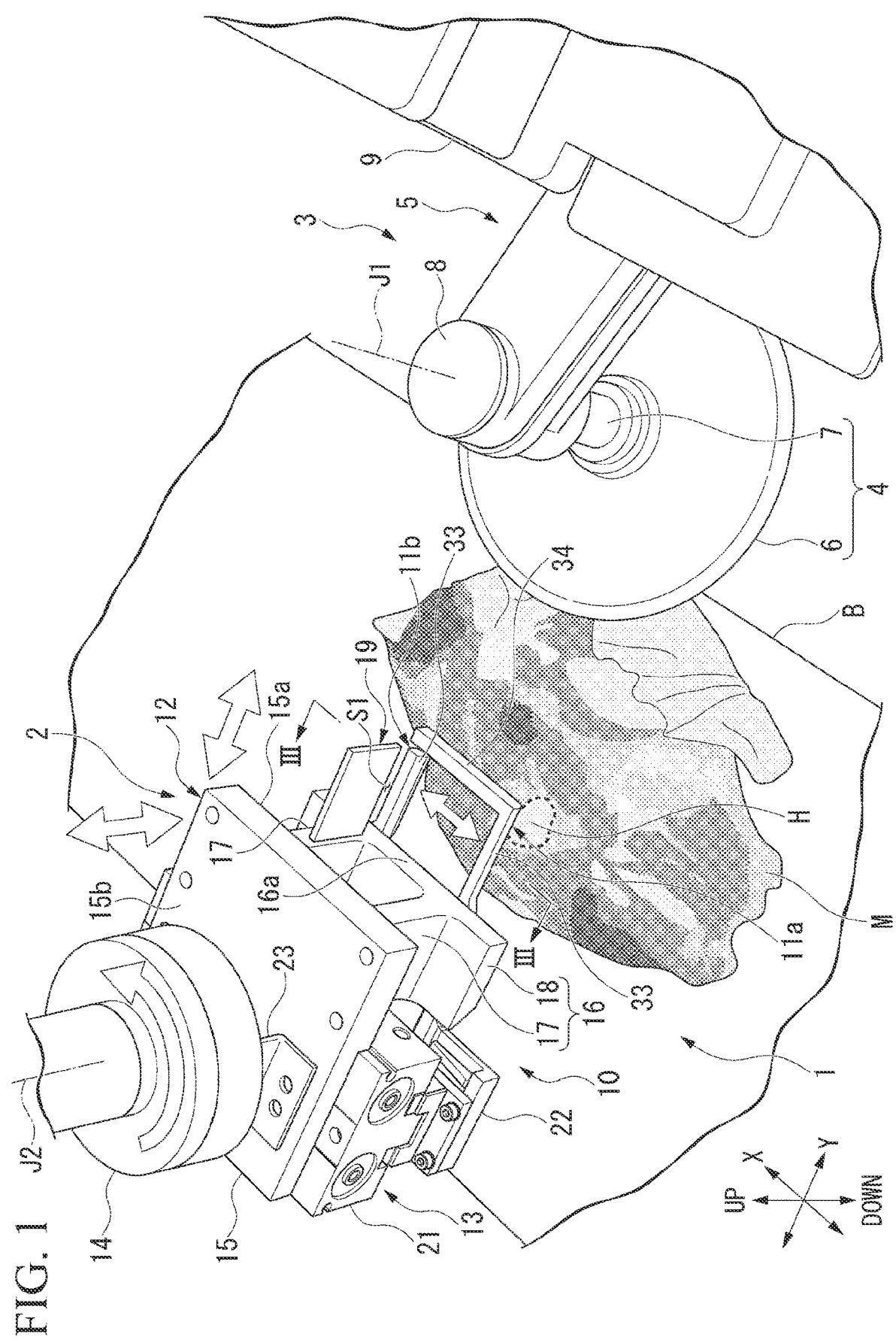
FIG. 1 is an oblique view of a meat-attached matter removal device of a first embodiment of the present invention.

FIG. 1 is an oblique view of a meat-attached matter removal device 1.

As shown in FIG. 1, the meat-attached matter removal device 1 is a device that removes an attached matter H attached to a chicken thigh meat M placed on a belt conveyor B from the chicken thigh meat M. The chicken thigh meat M is a thigh meat deboned from a poultry carcass. The attached matter H is a cartilage C attached to the chicken thigh meat M and a fat body F attached to the chicken thigh meat M and the cartilage C. The fat body F is a mass of fat. The detailed structure of the attached matter H will be described later.

The meat-attached matter removal device 1 includes an attached matter raising unit 2 and a cutter unit 3 which are arranged above the belt conveyor B. The attached matter raising unit 2 and the cutter unit 3 are arranged above the belt conveyor B to face each other in the surface direction of the belt conveyor B and in a direction orthogonal to the conveying direction of the belt conveyor B (the X direction in FIG. 1).

Hereinafter, it is assumed that the surface direction of the belt conveyor B is along the horizontal direction. That is, the attached matter raising unit 2 and the cutter unit 3 are arranged to face each other in the horizontal direction. In the attached matter raising unit 2 and the cutter unit 3 which are in a usable posture, the facing direction is referred to as the Y direction, and the direction orthogonal to the Y direction and along the horizontal direction (the conveying direction of the belt conveyor B) may be referred to as the X direction. The vertical direction and the horizontal direction are directly referred to as the vertical direction and the horizontal direction.

<Cutter Unit>

The cutter unit 3 cuts the attached matter H from the chicken thigh meat M. The cutter unit 3 is fixed to a fixed position above the belt conveyor B. The cutter unit 3 includes a circular blade 4 and a cutter driving unit 5 which rotationally drives the circular blade 4. The circular blade 4 includes a disc-shaped circular blade body (an example of a cutter in the claims) 6 and a cutter shaft 7 which has one end fixed to the circular blade body 6 and is disposed concentrically.

The cutter driving unit 5 includes a shaft support portion 8 which rotatably supports the cutter shaft 7 and a cutter driving unit body 9 which is integrally provided with the shaft support portion 8. The cutter driving unit body 9 includes a motor unit (not shown) and a transmission shaft which transmits the rotation of the motor unit to the cutter shaft 7. The cutter shaft 7 is rotated around a center axis J1 by the cutter driving unit body 9.

<Attached Matter Raising Unit>

Figure 2:
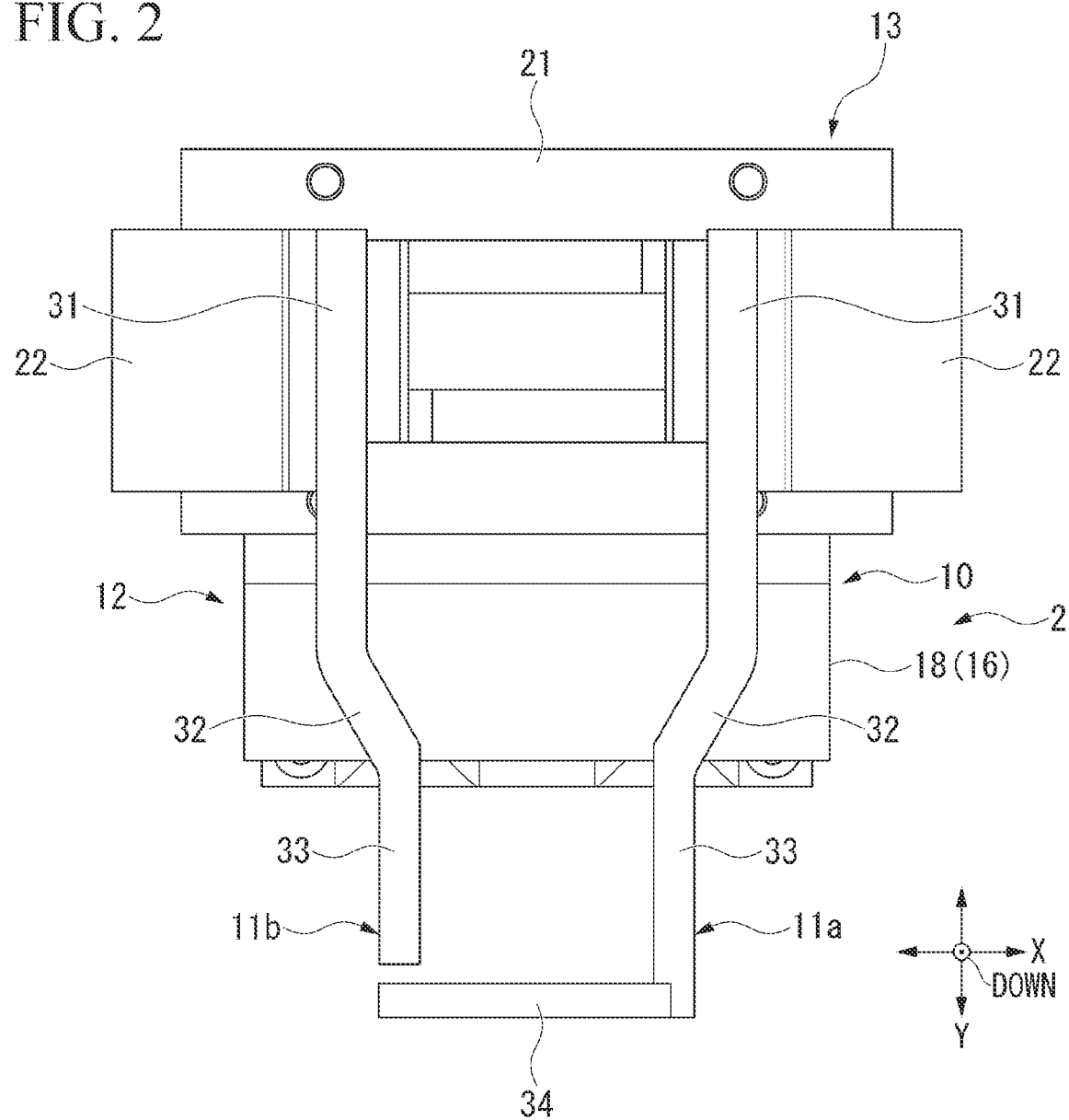
FIG. 2 is a plan view of a cartilage raising unit of the first embodiment of the present invention when viewed from below.

FIG. 2 is a plan view of the attached matter raising unit 2 when viewed from below. The attached matter raising unit 2 raises the attached matter H from the chicken thigh meat M.

As shown in FIGS. 1 and 2, the attached matter raising unit 2 includes an arm driving unit (an example of a driving unit in the claims) 10 and a pair of gripping arms 11a and 11b (a first gripping arm 11a and a second gripping arm 11b) which are attached to the arm driving unit 10.

<Arm Driving Unit>

The arm driving unit (an example of a driving unit in the claims) 10 drives the pair of gripping arms 11a and 11b. The arm driving unit 10 includes a movable block 12 and an arm opening/closing driving unit (an example of an opening/closing driving unit in the claims) 13 and a block driving unit (an example of a contact/separation driving unit and a rotation driving unit in the claims) 14 which are attached to the movable block 12.

<Movable Block>

The movable block 12 includes a plate-shaped base portion 15. The plate thickness direction of the base portion 15 matches the vertical direction. The base portion 15 is formed in a square shape when viewed from the vertical direction. A pressing block 16 is integrally provided on the side of the cutter unit 3 in a lower surface 15a of the base portion 15. The pressing block 16 prevents the chicken thigh meat M from rising around the attached matter H when the pair of gripping arms 11a and 11b are pressed against the chicken thigh meat M (details will be described later).

The pressing block 16 includes plurality of (for example, two in the first embodiment) legs 17 that protrude downward from the base portion 15 and a plate-shaped pressing plate 18 which is integrally molded with the lower end of the leg 17. The plate thickness direction of the pressing plate 18 matches the vertical direction. The pressing plate 18 is formed in a rectangular shape to be elongated in the X direction when viewed from the vertical direction.

One leg 17 of two legs 17 is provided with an escape prevention plate (an example of a cutter escape prevention portion in the claims) 19 which protrudes toward the cutter unit 3. The escape prevention plate 19 has a role of preventing the uncut attached matter H from escaping when cutting the attached matter H by the circular blade body 6 (details will be described later). The escape prevention plate 19 is disposed at a position on the downstream side (the right side in FIG. 1) from the center axis J1 of the circular blade body 6 in the rotation direction of the circular blade body 6 on the side of the attached matter raising unit 2.

An arm opening/closing driving unit 13 is attached to the base portion 15 of the movable block 12, on the side opposite to the cutter unit 3 compared to the pressing block 16 of the lower surface 15a.

<Arm Opening/Closing Driving Unit>

The arm opening/closing driving unit 13 includes a driving unit body 21 and a pair of sliders 22 which are provided in the lower portion of the driving unit body 21 and to which the gripping arms 11a and 11b are respectively fixed. The pair of sliders 22 are driven by the driving unit body 21. The pair of sliders 22 approach and separate from each other in the X direction in the standby posture.

The standby posture means a posture in which the attached matter raising unit 2 and the cutter unit 3 are in usable state and before the operation of removing the attached matter H from the chicken thigh meat M is started. In the following description, the attached matter raising unit 2 and the cutter unit 3 are described in the standby posture unless otherwise specified.

The driving unit body 21 is configured as, for example, an air cylinder that uses compressed air as a drive source. The slider 22 is attached to a piston rod of the air cylinder. However, the present invention is not limited thereto and the driving unit body 21 may be configured so that the pair of sliders 22 approach and separate from each other. For example, the driving unit body may be configured by using a ball screw or the like.

A bracket 23 is provided on an upper surface 15b of the base portion 15 on the side opposite to the cutter driving unit 5 compared to the center in the Y direction. The block driving unit 14 is attached to the bracket 23.

<Block Driving Unit>

The block driving unit 14 is a so-called multi-joint robot. The block driving unit 14 moves the movable block 12 in the vertical direction, the inclined vertical direction, and the horizontal direction. The block driving unit 14 rotates the movable block 12 around a center axis J2 parallel to the vertical direction. Since the belt conveyor B is disposed below the movable block 12, the movement of the movable block 12 in the vertical direction corresponds to the direction in which the movable block approaches and separates from the chicken thigh meat M. Since the center axis J2 is parallel to the vertical direction, the center axis is parallel to the direction in which the movable block 12 approaches and separates from the belt conveyor B (the chicken thigh meat M).

<Gripping Arm>

The pair of gripping arms 11a and 11b have a role of gripping the attached matter H of the chicken thigh meat M (details will be described later). The pair of gripping arms 11a and 11b are fixed to one side of each of the facing sides of the pair of sliders 22 provided in the arm opening/closing driving unit 13. That is, the pair of gripping arms 11a and 11b are arranged to face each other in the X direction and approach and separate from each other (open and close) in the X direction. FIGS. 1 and 2 show a state in which the pair of gripping arms 11a and 11b separate from each other (in an open state).

In the pair of gripping arms 11a and 11b, the first gripping arm 11a is disposed on a position which is the upstream side (the left side in FIG. 1) in the rotation direction on the side of the attached matter raising unit 2 compared to the center axis J1 of the circular blade body 6 provided in the cutter unit 3. In the pair of gripping arms 11a and 11b, the second gripping arm 11b is disposed on a position which is the downstream side (the right side in FIG. 1) in the rotation direction on the side of the attached matter raising unit 2 compared to the center axis J1 of the circular blade body 6 provided in the cutter unit 3.

Since the pair of gripping arms 11a and 11b are line-symmetrically with respect to the Y direction, the first gripping arm 11a of the pair of gripping arms 11a and 11b will be described in the following description. The second gripping arm 11b will be indicated by the same reference numerals of the first gripping arm 11a and the description thereof will be omitted. The second gripping arm 11b will be described as necessary.

The first gripping arm 11a is a rod which extends from the slider 22 toward the cutter unit 3. More specifically, the first gripping arm 11a includes a fixed arm portion 31 which is fixed to the slider 22, a horizontal bending arm portion (an example of a widening portion in the claims) 32 which is integrally molded with the end of the fixed arm portion 31 on the side of the cutter unit 3, and a gripping arm body 33 which is integrally molded with the end of the horizontal bending arm portion 32 on the side of the cutter unit 3.

The fixed arm portion 31 extends in the Y direction from the end on the side opposite to the cutter unit 3 of the slider 22 to a position slightly closer to the cutter unit 3 than the driving unit body 21. The horizontal bending arm portion 32 extends obliquely in the horizontal direction toward the second gripping arm 11b as it goes from the fixed arm portion 31 toward the cutter unit 3.

The pressing plate 18 is disposed above both a part of the fixed arm portion 31 that protrudes toward the cutter unit 3 compared to the driving unit body 21 and the horizontal bending arm portion 32. A minute gap is formed between the pressing plate 18 and each of the gripping arms 11a and 11b.

The gripping arm body 33 extends in the Y direction to protrude from the end of the horizontal bending arm portion 32 on the side of the cutter unit 3 toward the cutter unit 3 in relation to the pressing plate 18. A gap S1 through which the circular blade body 6 of the cutter unit 3 can pass is formed between the gripping arm body 33 and the escape prevention plate 19 provided on the pressing block 16.

The gripping arm body 33 grips the attached matter H of the chicken thigh meat M (details will be described later). That is, the end of the gripping arm body 33 on the side of the cutter unit 3 corresponds to the tips of the gripping arms 11a and 11b in the claims and the side of the arm opening/closing driving unit 13 of the gripping arm body 33 (the horizontal bending arm portion 32, the fixed arm portion 31) corresponds to the base end of the gripping arm body 33 in the claims.

Figure 3:
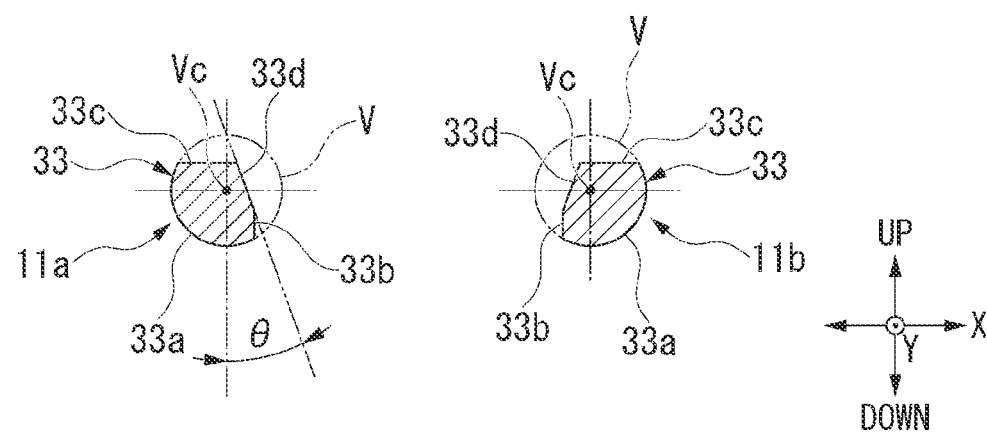
FIG. 3 is a cross-sectional view taken along a line III-III of FIG. 1.

FIG. 3 is a cross-sectional view taken along a line III-III of FIG. 1.

As shown in FIG. 3, the gripping arm body 33 includes an arcuate surface (an example of a first arcuate surface in the claims) 33a, a vertical wall surface (an example of a first vertical wall surface in the claims) 33b and an upper wall surface (an example of a first upper wall surface in the claims) 33c which are connected to the arcuate surface 33a, and an inclined surface (an example of a first inclined surface in the claims) 33d which is provided to straddle the vertical wall surface 33b and the upper wall surface 33c in a cross-section along the vertical direction and the X direction.

The arcuate surface 33a is formed between the lower side (the arrangement side of the chicken thigh meat M) and the side opposite to the second gripping arm 11b (the side opposite to the mutually facing side of the gripping arms 11a and 11b).

The vertical wall surface 33b, the upper wall surface 33c, and the inclined surface 33d are formed by cutting out the virtual circle V passing through the arcuate surface 33a. That is, the vertical wall surface 33b extends upward from the end of the arcuate surface 33a on the side of the second gripping arm 11b. The vertical wall surfaces 33b of the gripping arms 11a and 11b are parallel to each other. The vertical wall surface 33b is located closer to the second gripping arm 11b than the center Vc of the virtual circle V.

The upper wall surface 33c extends horizontally from the end of the arcuate surface 33a on the side opposite to the second gripping arm 11b toward the second gripping arm 11b. The upper wall surface 33c is located above the center Vc of the virtual circle V. The upper wall surfaces 33c of the gripping arms 11a and 11b are located on the same plane. In the following description, the center Vc of the virtual circle V is referred to as the center Vc of the gripping arm body 33.

The inclined surface 33d is provided to straddle the upper end of the vertical wall surface 33b and the end of the upper wall surface 33c on the side of the second gripping arm 11b. The inclined surface 33d is inclined toward the second gripping arm 11b as it goes from the upper wall surface 33c toward the vertical wall surface 33b. In other words, the inclined surface 33d is inclined so that the distance between the pair of gripping arm bodies 33 becomes short as it goes from the upper wall surface 33c toward the vertical wall surface 33b.

Returning to FIGS. 1 and 2, the gripping arm body 33 in the first gripping arm 11a is longer than the gripping arm body 33 in the second gripping arm 11b. That is, the gripping arm body 33 in the first gripping arm 11a protrudes toward the cutter unit 3 compared to the gripping arm body 33 in the second gripping arm 11b. A falling prevention bar (an example of a convex portion in the claims) 34 is integrally provided with the tip of the gripping arm body 33 in the protruding first gripping arm 11a.

The falling prevention bar 34 is a rod which extends from the tip of the gripping arm body 33 of the first gripping arm 11a toward the second gripping arm 11b in the X direction. The length of the falling prevention bar 34 is a length in which the tip of the falling prevention bar 34 is located at the tip of the gripping arm body 33 in the second gripping arm 11b while the pair of gripping arms 11a and 11b are open (in the state of FIGS. 1 and 2).

Figure 4:
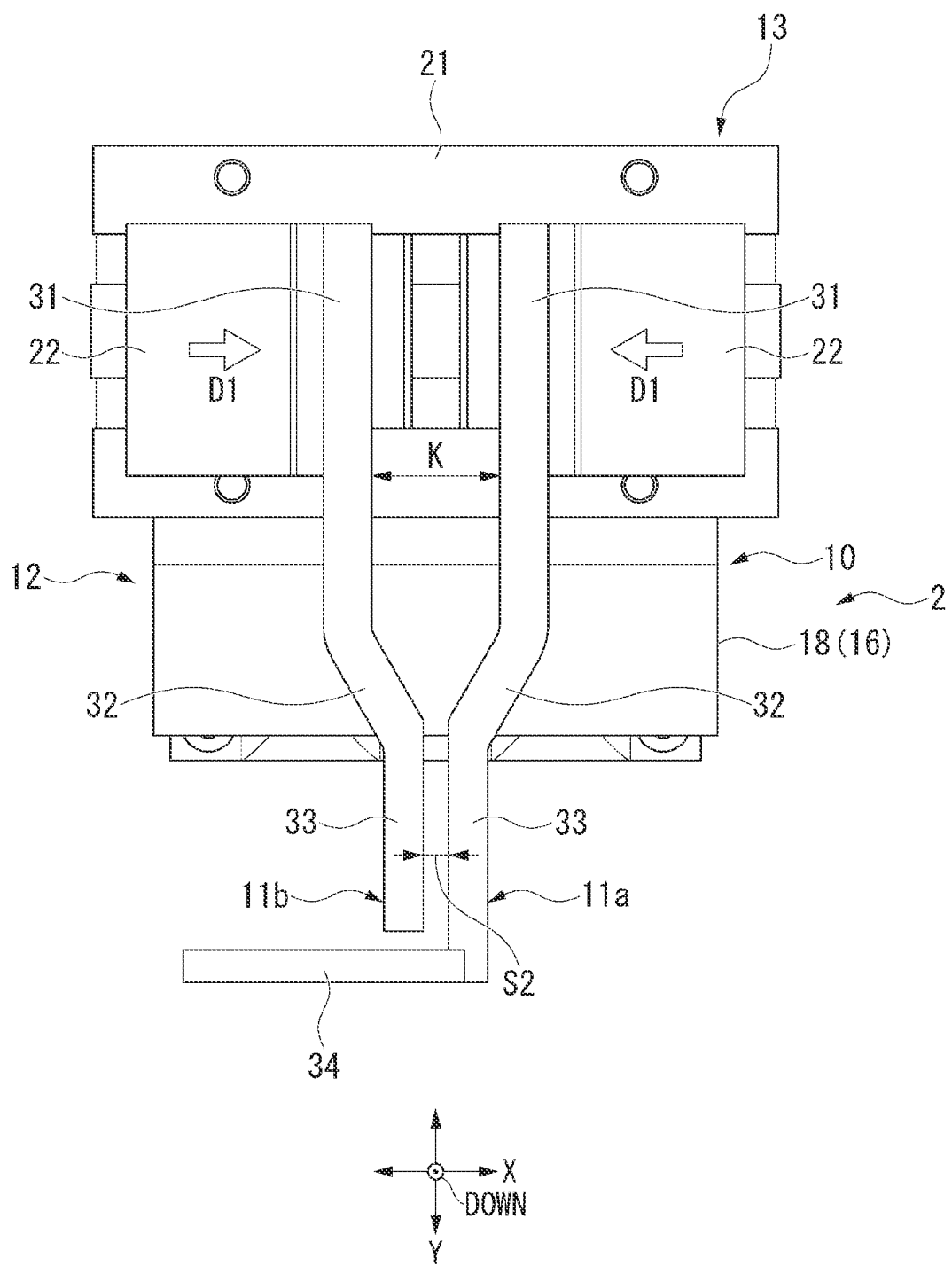
FIG. 4 is an explanatory diagram of the operation of the cartilage raising unit of the first embodiment of the present invention.

FIG. 4 is an explanatory diagram of the operation of the attached matter raising unit 2 and shows a state (closed state) in which the pair of gripping arms 11a and 11b are closest to each other. FIG. 4 corresponds to FIG. 2.

As shown in FIG. 4, when the arm opening/closing driving unit 13 moves the pair of sliders 22 to approach each other (see the arrow D1 in FIG. 4), the pair of gripping arms 11a and 11b are moved together to approach each other.

In a state (closed state) in which the pair of gripping arms 11a and 11b are closest to each other, the gripping arm bodies 33 face each other in the X direction via a gap S2 in a non-contact state. The size of the gap S2 is small enough to raise the attached matter H from the chicken thigh meat M when the pair of gripping arms 11a and 11b grip the attached matter H of the chicken thigh meat M (details will be described later).

Each of the gripping arms 11a and 11b includes the horizontal bending arm portion 32 provided on the base end side of the gripping arm body 33. The horizontal bending arm portion 32 extends obliquely toward either the first gripping arm 11a or the second gripping arm 11b as it goes from the fixed arm portion 31 toward the cutter unit 3. Therefore, the pair of horizontal bending arm portions 32 are widened toward the side opposite to the cutter unit 3 from the base end of the gripping arm body 33. Thus, a sufficient gap K is ensured between the fixed arm portions 31 even when the gripping arm bodies 33 are closest to each other.

<Operation of Meat-Attached Matter Removal Device>

Next, the operation of the meat-attached matter removal device 1 will be described with reference to FIG. 1 and FIGS. 5 to 10.

Figure 5:
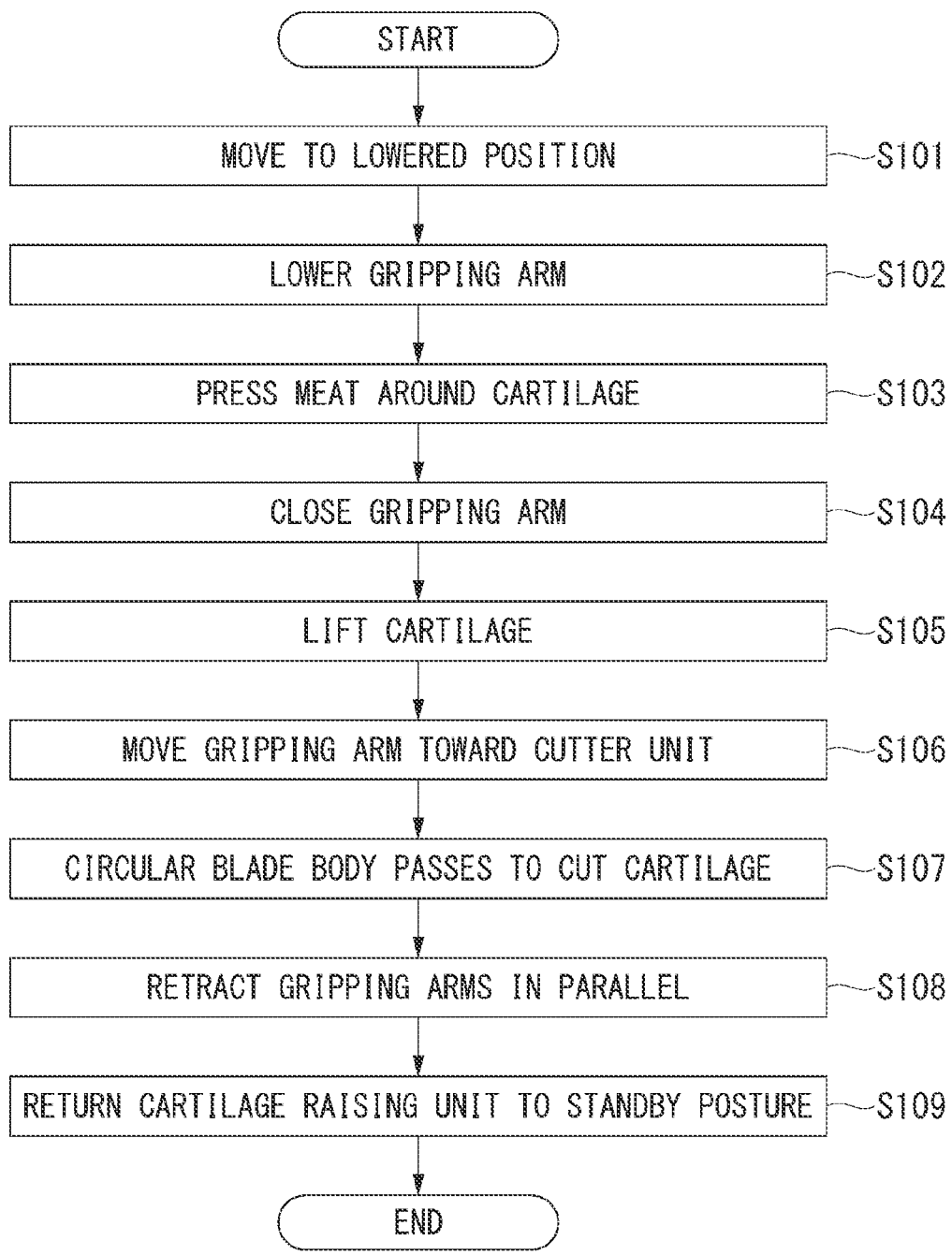
FIG. 5 is a flowchart of the operation of the meat-attached matter removal device of the first embodiment of the present invention.
Figure 6:
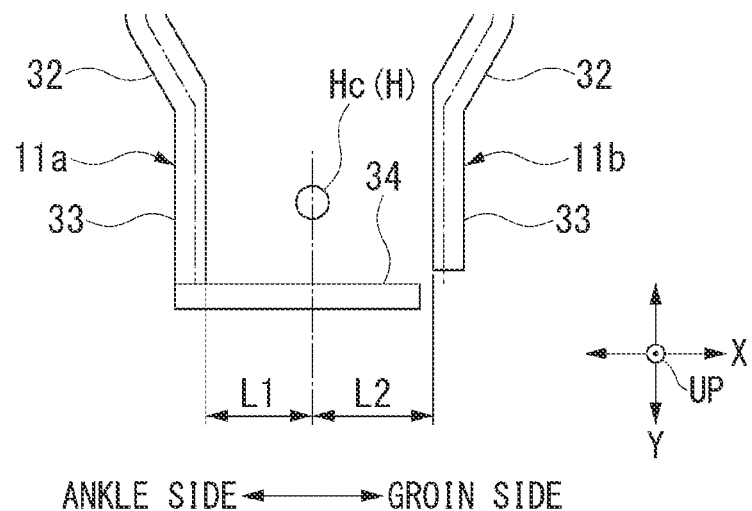
FIG. 6 is a diagram showing a positional relationship between chicken thigh meat and a pair of gripping arms of the first embodiment of the present invention.

FIG. 5 is a flowchart of the operation of the meat-attached matter removal device 1. FIG. 6 is a diagram showing a positional relationship between the chicken thigh meat M and the pair of gripping arms 11a and 11b. FIGS. 7 to 11 are explanatory diagrams of the operation of the meat-attached matter removal device 1 and show each step.

A control unit (not shown) performs the driving control of the attached matter raising unit 2 and the cutter unit 3 constituting the meat-attached matter removal device 1. The operation flow shown in FIG. 5 is the flow of the attached matter raising unit 2 and the cutter unit 3 operated on the basis of a control signal from the control unit (not shown), a description of the output signal from the control unit will be omitted in the following description.

In the steps before the meat-attached matter removal device 1, although not shown in the drawings, there is a step of detecting the posture of the deboned chicken thigh meat M and the position of the attached matter H. In this step, the posture of the deboned chicken thigh meat M and the position of the attached matter H are detected on the basis of the result of the image taken by a camera (not shown). This detection result is output as a signal to the control unit that performs the driving control of the meat-attached matter removal device 1.

The chicken thigh meat M is conveyed on the belt conveyor B so that the skin side always faces the side of the belt conveyor B and the side exposing the attached matter H by cutting open faces the upper side. The chicken thigh meat M is placed on the belt conveyor B so that the stature direction of the chicken thigh meat M is substantially along the conveying direction (the X direction).

As shown in FIGS. 1 and 5, the chicken thigh meat M is moved below the meat-attached matter removal device 1 above the belt conveyor B (step S101 in FIG. 5). At this time point, the attached matter raising unit 2 is in the standby posture.

Figure 7:
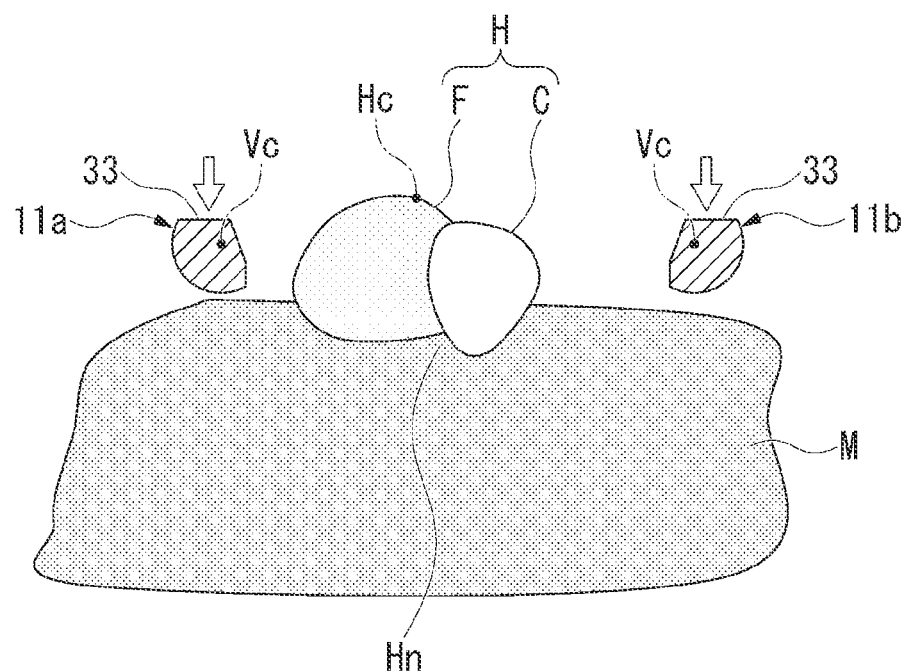
FIG. 7 is an explanatory diagram of the operation of the meat-attached matter removal device of the first embodiment of the present invention.

Next, as shown in FIGS. 1, 5, and 7, the block driving unit 14 operates the movable block 12 to move downward from the standby posture so that the pair of gripping arms 11a and 11b contact the chicken thigh meat M (step S102 in FIG. 5). In the standby posture, the pair of gripping arms 11a and 11b are open.

The positional relationship between the chicken thigh meat M and the pair of gripping arms 11a and 11b at the time point in which the pair of gripping arms 11a and 11b contact the chicken thigh meat M will be described with reference to FIGS. 1 and 6.

As shown in FIG. 1, the block driving unit 14 rotates the movable block 12 around the center axis J2 to change the orientation of the pair of gripping arms 11a and 11b so that the ankle side of the chicken thigh meat M and the groin side of the chicken thigh meat M are located on both sides with the pair of gripping arms 11a and 11b between the pair of gripping arms 11a and 11b (gripping arm orientation adjusting step).

At this time, the attached matter H is located between the gripping arm bodies 33 of the pair of gripping arms 11a and 11b. The facing direction of the pair of gripping arm bodies 33 (the direction orthogonal to the extension direction of each of the gripping arms 11a and 11b and along the horizontal direction) is made to match the stature direction of the chicken thigh meat M. The orientations of the ankle side and the groin side of the chicken thigh meat M are aligned in a predetermined orientation. For example, in this first embodiment, as shown in FIG. 6, the angle side of the chicken thigh meat M is located on the side of the first gripping arm 11a and the groin side of the chicken thigh meat M is located on the side of the second gripping arm 11b. Hereinafter, a description will be made on the assumption that the pair of gripping arms 11a and 11b and the chicken thigh meat M are in the posture shown in FIG. 6.

In the gripping arm orientation adjusting step, the pair of gripping arms 11a and 11b are moved so that the distance L1 between the gripping arm body 33 of the first gripping arm 11a on the ankle side of the chicken thigh meat M and the center He of the attached matter H becomes shorter than the distance L2 between the gripping arm body 33 of the second gripping arm 11b on the groin side of the chicken thigh meat M and the center He of the attached matter H when viewed from the vertical direction. That is, a large space is ensured between the gripping arm body 33 of the second gripping arm 11b and the center He of the attached matter H.

This is because the shape of the cartilage C of the attached matter H is not symmetrical with respect to the fat body F in the stature direction of the chicken thigh meat M (see FIG. 7 and the like). That is, the shape of the cartilage C is shifted to the root side (the lower right side in FIG. 7) with respect to the fat body F in the stature direction of the chicken thigh meat M. Therefore, it is possible to ensure a large space between the attached matter H and the second gripping arm 11b, which is on the arrangement side of the cartilage C relative to the center He of the attached matter H, by ensuring a large space between the gripping arm body 33 of the second gripping arm 11b on the groin side of the chicken thigh meat M and the center He of the attached matter H. As a result, it is possible to prevent these gripping arms 11a and 11b from pressing down on a particularly hard part (that is, the cartilage C) of the attached matter H when gripping the attached matter H by the pair of gripping arms 11a and 11b. Thus, when the cartilage C is gripped by the pair of gripping arms 11a and 11b, the attached matter H can be reliably raised from the chicken thigh meat M by these gripping arms 11a and 11b.

Figure 8:
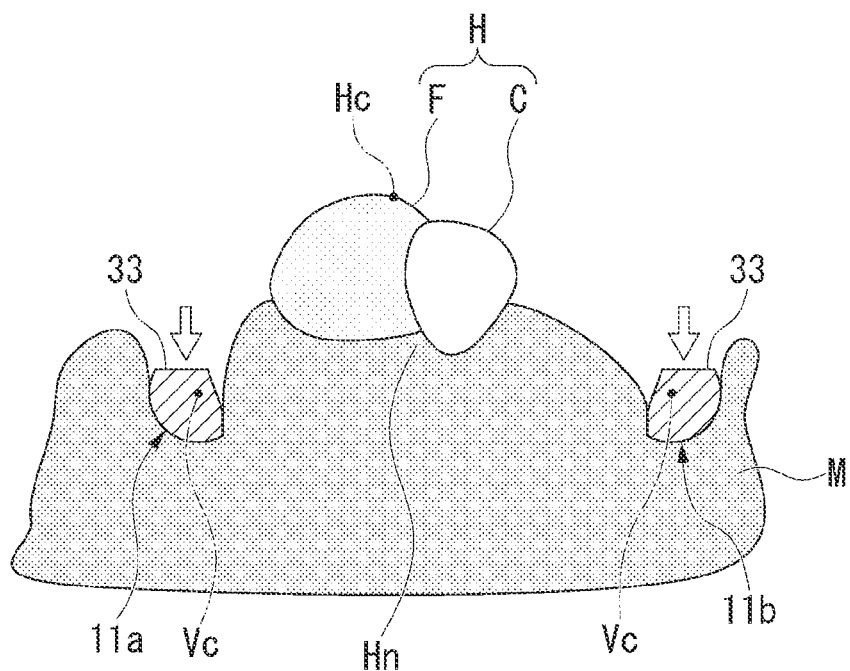
FIG. 8 is an explanatory diagram of the operation of the meat-attached matter removal device of the first embodiment of the present invention.

Subsequently, as shown in FIGS. 1, 5, and 8, the pair of gripping arms 11a and 11b are pressed against the chicken thigh meat M so that a constant pressure is applied to the chicken thigh meat M by the block driving unit 14 (pressing step; step S103 in FIG. 5).

At this time, the arcuate surface 33a formed at the lower portion of the gripping arm body 33 is pressed against the chicken thigh meat M. Since the arcuate surface 33a is pressed, it is possible to prevent the chicken thigh meat M from being damaged by the gripping arm body 33.

The pressing plate 18 is disposed at a part of the fixed arm portion 31 that protrudes toward the cutter unit 3 compared to the driving unit body 21 and above the horizontal bending arm portion 32 with a minute gap therebetween.

When pressing the pair of gripping arms 11a and 11b against the chicken thigh meat M, the pressed meat escapes around the gripping arms 11a and 11b and the chicken thigh meat M around the attached matter H tries to rise. However, the pressing plate 18 prevents the chicken thigh meat M around the attached matter H from rising (hereinafter, simply referred to as rising of the chicken thigh meat M).

The pair of gripping arms 11a and 11b are pressed against the chicken thigh meat M so that a constant pressure is reliably applied thereto while preventing the rising of the chicken thigh meat M.

The constant pressure is a force of pressing the pair of gripping arms 11a and 11b against the chicken thigh meat M so that the center Vc of the gripping arm body 33 is located on the lower side (the side of the belt conveyor B) than the base Hn (see FIG. 7, hereinafter simply referred to as the base Hn of the attached matter H) buried on the side of the chicken thigh meat M of the attached matter H (hereinafter, referred to as the pressing force of the gripping arms 11a and 11b). That is, the constant pressure value changes depending on the state of the chicken thigh meat M. For example, the hardness of the chicken thigh meat M changes depending on the production area of the chicken thigh meat M. When the chicken thigh meat M is hard, the pressing force of the gripping arms 11a and 11b gets larger than when the chicken thigh meat M is soft.

FIG. 7 shows that a clear boundary exists between the fat body F and the chicken thigh meat M, but this is for easy understanding of the description. In fact, the boundary between the chicken thigh meat M and the fat body F becomes blurred as their tissues intertwine with each other. Thus, the base Hn of the attached matter H includes the area around the boundary between the attached matter H and the chicken thigh meat M. The base Hn of the attached matter H in a broad sense means a part in which the chicken thigh meat M other than the attached matter H is scraped off and cut to the extent that no hole is made in the chicken thigh meat M when cutting the attached matter H.

Figure 9:
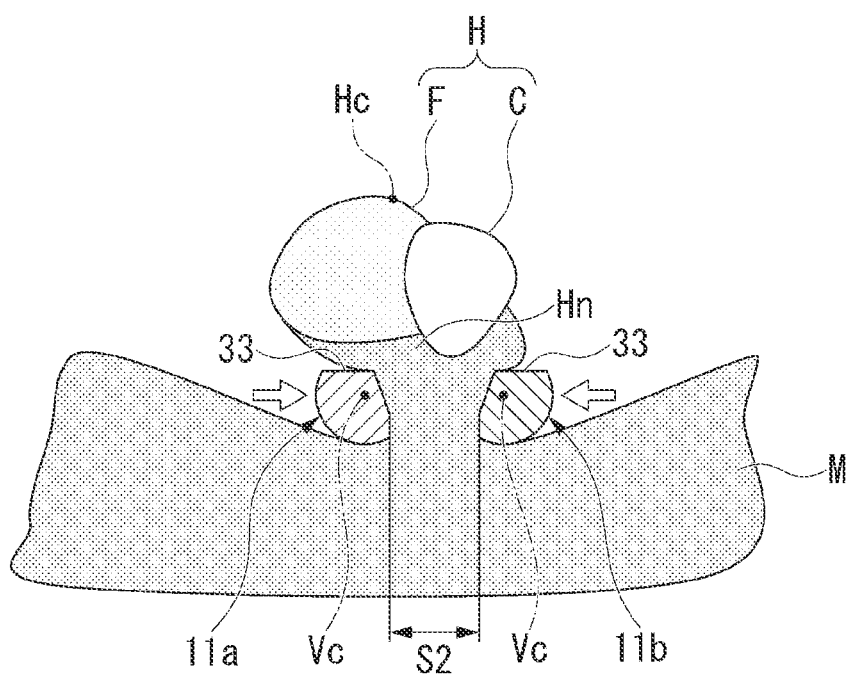
FIG. 9 is an explanatory diagram of the operation of the meat-attached matter removal device of the first embodiment of the present invention.

Subsequently, as shown in FIGS. 1, 5, and 9, the pair of gripping arms 11a and 11b are closed by the arm opening/closing driving unit 13 (raising step; step S104 in FIG. 5). At this time, only the gap S2 is ensured between the pair of gripping arm bodies 33. When the pair of gripping arms 11a and 11b are closed, the attached matter H is pressed upward by each gripping arm body 33 to rise upward.

The vertical wall surface 33b, the upper wall surface 33c, and the inclined surface 33d are formed in the gripping arm bodies 33 on the approaching side of these gripping arm bodies 33. Therefore, when the gripping arm bodies 33 approach each other, the attached matter H is easily pressed upward along the inclined surface 33d. The attached matter H tends to ride on the upper wall surface 33c located below the upper edge of the virtual circle V by cutting out the virtual circle V (see FIG. 3).

In the gripping arm orientation adjusting step, the distance L1 between the gripping arm body 33 of the first gripping arm 11a on the ankle side of the chicken thigh meat M and the center He of the attached matter H is shorter than the distance L2 between the gripping arm body 33 of the second gripping arm 11b on the groin side of the chicken thigh meat M and the center He of the attached matter H. Therefore, the space on the part of the groin side from the center He of the attached matter H, which is harder than the part of the ankle side from the center He of the attached matter H, is larger than that on the part of the ankle side from the center He of the attached matter H. Since this space is large, it is possible to prevent the cartilage C from being pressed downward by the gripping arms 11a and 11b. Thus, the attached matter H can be reliably raised.

The horizontal bending arm portion 32 is formed on the base end side of each gripping arm body 33. These horizontal bending arm portions 32 are widened from the base end of the gripping arm body 33 toward the side opposite to the cutter unit 3. Therefore, a sufficient gap K is ensured between the fixed arm portions 31 even in a state in which the pair of gripping arms 11a and 11b are closed (see FIG. 4). Thus, the chicken thigh meat M at a part other than the attached matter H is not pinched by these gripping arms 11a and 11b at the same time when the attached matter H is gripped by the pair of gripping arms 11a and 11b.

The falling prevention bar 34 is integrally provided with the tip of the gripping arm body 33 in the first gripping arm 11a. Therefore, when the attached matter H is gripped by the pair of gripping arm bodies 33, the attached matter H is prevented from escaping from the tips of these gripping arm bodies 33.

The same can be said for the base end side of the gripping arm body 33. That is, the pressing block 16 is disposed on the base end side of the gripping arm body 33. A side surface 16a (see FIG. 1) of the pressing block 16 functions as an arm escape prevention portion that prevents the attached matter H from escaping from the base end side of the gripping arm body 33.

Figure 10:
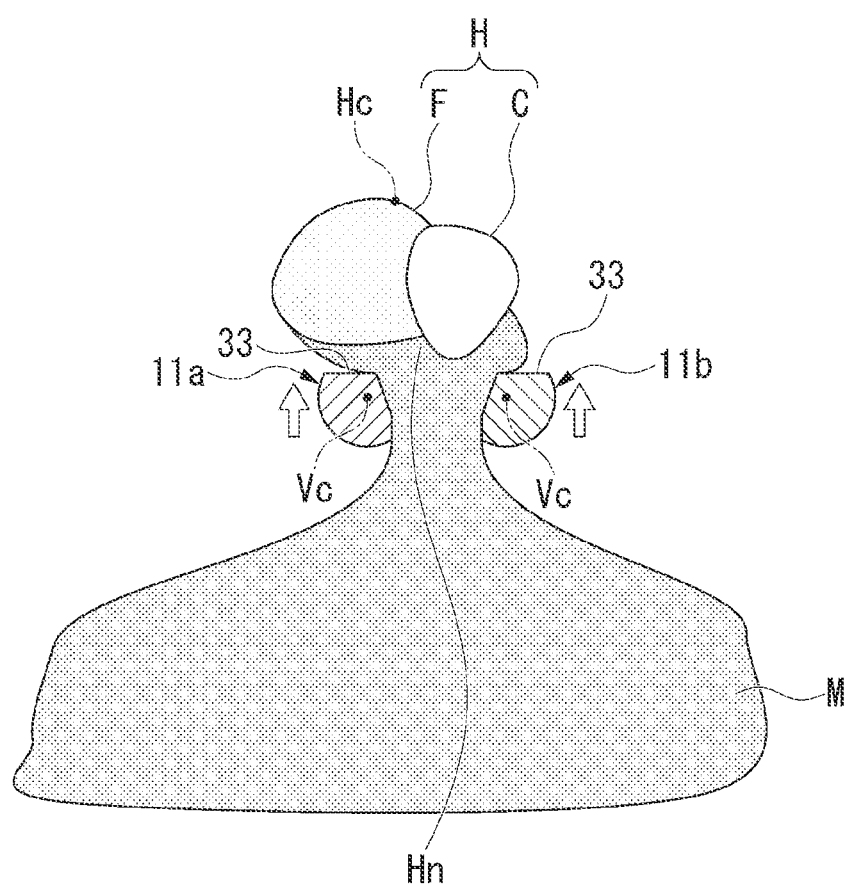
FIG. 10 is an explanatory diagram of the operation of the meat-attached matter removal device of the first embodiment of the present invention.

Subsequently, as shown in FIGS. 1, 5, and 10, the block driving unit 14 lifts the attached matter H while gripping the attached matter H by the pair of gripping arm bodies 33 (lifting step; step S105 in FIG. 5). Then, the chicken thigh meat M around the attached matter H will sag due to the own weight. As a result, the attached matter H is exposed on the upper wall surface 33c of the gripping arm body 33 around the gripping arm body 33. That is, it becomes a state in which there is no chicken thigh meat M other than the attached matter H on the upper wall surface 33c of the gripping arm body 33.

Subsequently, the block driving unit 14 brings the pair of gripping arms 11a and 11b toward the cutter unit 3 in this state (step S106 in FIG. 5). At this time, the circular blade 4 is rotated by the cutter driving unit body 9 in advance.

Figure 11:
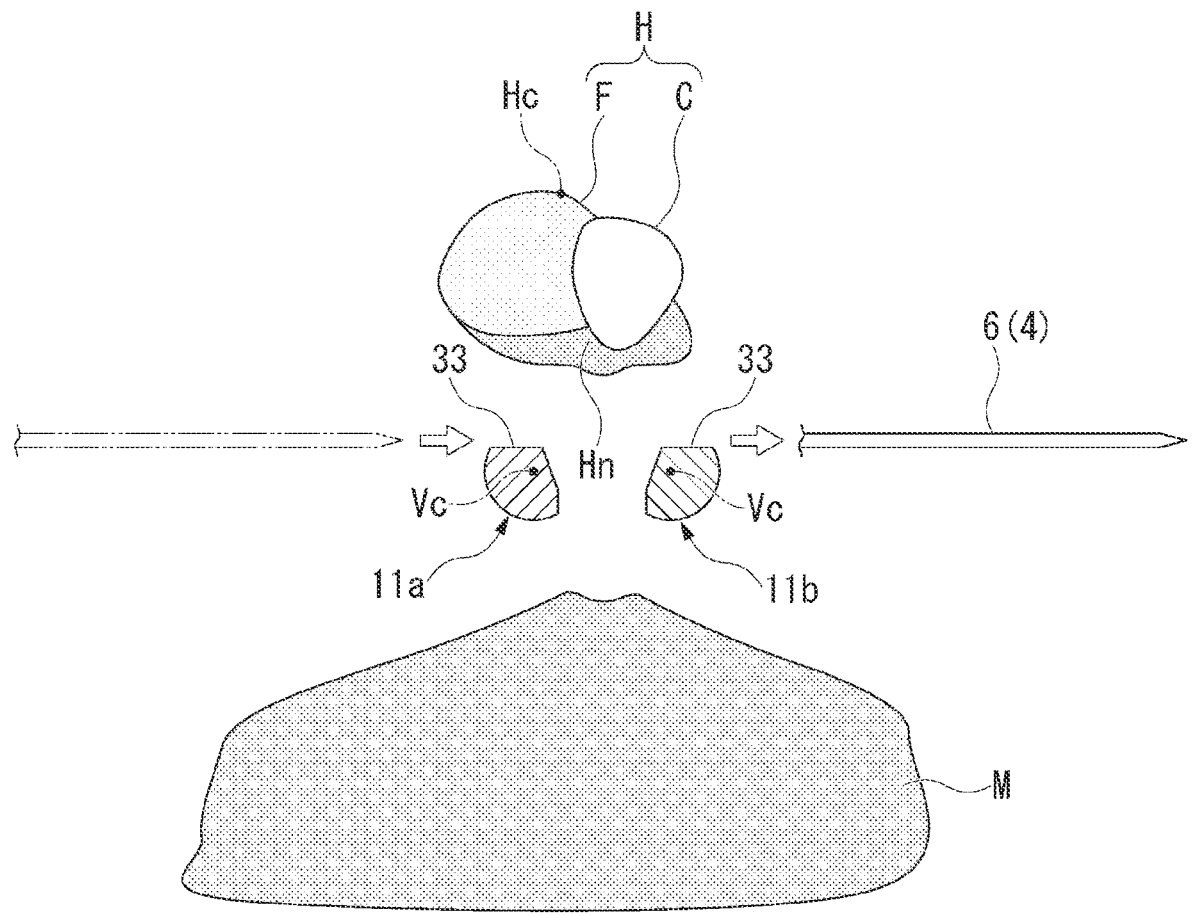
FIG. 11 is an explanatory diagram of the operation of the meat-attached matter removal device of the first embodiment of the present invention.

Subsequently, as shown in FIGS. 1, 5, and 11, the block driving unit 14 moves the pair of gripping arms 11a and 11b so that the circular blade body 6 of the circular blade 4 passes over the upper wall surface 33c of the gripping arm body 33. When the circular blade body 6 passes over the upper wall surface 33c, the pair of gripping arms 11a and 11b are moved in the horizontal direction (the direction orthogonal to the cutter shaft 7). Then, the circular blade body 6 passes while pressing the base Hn of the attached matter H so that the attached matter H is cut at the base Hn (cutting step; step S107 in FIG. 5). Since the upper wall surface 33c extends horizontally, the circular blade body 6 can pass through the vicinity of the base Hn of the attached matter H.

When cutting the attached matter H while pressing the circular blade body 6 against the base Hn of the attached matter H, there is a possibility that the uncut attached matter H may escape from the circular blade body 6 on the way (hereinafter, referred to as the escape of the attached matter H) because the chicken thigh meat M is soft. However, since the movable block 12 is provided with the escape prevention plate 19, the escape of the attached matter H is prevented by the escape prevention plate 19. Since the gap S1 is formed between the escape prevention plate 19 and the second gripping arm 11b, the passage of the circular blade body 6 over the upper wall surface 33c is not obstructed by the escape prevention plate 19. Therefore, the attached matter H can be reliably cut at the base Hn of the attached matter H.

Subsequently, as shown in FIGS. 1 and 5, the block driving unit 14 retracts the pair of gripping arms 11a and 11b from the cutter unit 3 in the horizontal direction (step S108 in FIG. 5).

Then, the attached matter raising unit 2 is returned to the standby posture (step S109 in FIG. 5). Accordingly, the operation of the meat-attached matter removal device 1 is completed.

In this way, the above-described meat-attached matter removal device 1 includes the pair of gripping arms 11a and 11b which grip the attached matter H attached to the deboned chicken thigh meat M at both sides from the base Hn of the attached matter H and raises the attached matter H from the chicken thigh meat M, the arm opening/closing driving unit 13 and the block driving unit 14 which drive the pair of gripping arms 11a and 11b, and the circular blade body 6 which cuts the base Hn of the attached matter H raised from the chicken thigh meat M.

Since the attached matter H is raised by the pair of gripping arms 11a and 11b and then the base Hn of the attached matter H is cut by the circular blade body 6, it is possible to suppress as much as possible the meat around the attached matter H from remaining on the side of the attached matter H when removing the attached matter H from the chicken thigh meat M by the circular blade body 6. Therefore, it is possible to improve the commercial value of the chicken thigh meat M while automating the process of removing the attached matter H attached to the deboned chicken thigh meat M.

The device for driving the pair of gripping arms 11a and 11b includes the block driving unit 14 which moves the pair of gripping arms 11a and 11b and the arm opening/closing driving unit 13 which opens and closes the pair of gripping arms 11a and 11b. Therefore, it is possible to grip the attached matter H using the pair of gripping arms 11a and 11b and further raise the attached matter H from the chicken thigh meat M with a simple structure.

The block driving unit 14 not only moves the movable block 12 in the vertical direction (the direction of approaching and separating from the chicken thigh meat M) and also rotates the movable block 12 around the center axis J2 parallel to the vertical direction. Therefore, the orientation of the pair of gripping arms 11a and 11b with respect to the attached matter H can be changed. The attached matter H can be easily gripped from both sides by these gripping arms 11a and 11b by changing the orientation of the pair of gripping arms 11a and 11b.

The falling prevention bar 34 is integrally provided with the tip of the gripping arm body 33 in the first gripping arm 11a. Therefore, when the attached matter H is gripped by the pair of gripping arm bodies 33, the attached matter H is prevented from escaping from the tips of these gripping arm bodies 33. Thus, the attached matter H can be reliably gripped by the gripping arms 11a and 11b. When the attached matter H is once gripped by the gripping arms 11a and 11b, the attached matter H can be reliably removed from the chicken thigh meat M thereafter.

The movable block 12 includes the pressing block 16. The side surface 16a of the pressing block 16 functions as the arm escape prevention portion that prevents the attached matter H from escaping from the base end side of the gripping arm body 33. Therefore, the attached matter H can be reliably gripped by the gripping arms 11a and 11b. When the attached matter H is once gripped by the gripping arms 11a and 11b, the attached matter H can be reliably removed from the chicken thigh meat M thereafter.

The movable block 12 is provided with the escape prevention plate 19. Therefore, when cutting the attached matter H by the circular blade body 6 of the cutter unit 3, it is possible to prevent the uncut attached matter H from escaping on the way and resulting in a defective cutting of the attached matter H.

The horizontal bending arm portion 32 is formed on the base end side of each gripping arm body 33. These horizontal bending arm portions 32 are widened from the base end of the gripping arm body 33 toward the side opposite to the cutter unit 3. Therefore, it is possible to prevent the chicken thigh meat M at a part other than the attached matter H from being pinched by these gripping arms 11a and 11b at the same time when the attached matter H is gripped by the pair of gripping arms 11a and 11b. As a result, it is possible to prevent the cutter unit 3 from scraping off the chicken thigh meat M at a part other than the attached matter H. Thus, the yield of the chicken thigh meat M can be improved.

The gripping arm body 33 includes the arcuate surface 33a, the vertical wall surface 33b and the upper wall surface 33c which are connected to the arcuate surface 33a, and the inclined surface 33d which is provided to straddle the vertical wall surface 33b and the upper wall surface 33c, in a cross-section along the vertical direction and the X direction. Therefore, because of the arcuate surface 33a, it is possible to prevent the chicken thigh meat M from being damaged when pressing the pair of gripping arms 11a and 11b against the chicken thigh meat M.

When pinching (gripping) the attached matter H by the pair of gripping arms 11a and 11b, it is possible to easily raise the attached matter H onto the pair of gripping arms 11a and 11b by the upper wall surface 33c and the inclined surface 33d. By placing the circular blade body 6 along the vicinity of the upper wall surface 33c, the attached matter H can be removed without remaining the meat around the attached matter H on the side of the attached matter H as much as possible.

In this way, the above-described meat-attached matter removal device 1 can be suitably used to remove the attached matter H from the chicken thigh meat M.

As a method of removing the attached matter H from the chicken thigh meat M using the meat-attached matter removal device 1, the method includes a pressing step of pressing the pair of gripping arms 11a and 11b against the chicken thigh meat M so that a constant pressure is applied thereto, a raising step of gripping the base Hn of the attached matter H by the pair of gripping arms 11a and 11b and raising the attached matter H from the chicken thigh meat M after the pressing step, and a cutting step of cutting the attached matter H from the base Hn of the attached matter H by the circular blade body 6.

By using such a method, it is possible to raise the attached matter H from the chicken thigh meat M by these gripping arms 11a and 11b when gripping the attached matter H by the pair of gripping arms 11a and 11b. Then, since the base Hn of the attached matter H is cut by the circular blade body 6, it is possible to suppress as much as possible the meat around the attached matter H from remaining on the side of the attached matter H when removing the attached matter H from the chicken thigh meat M. Therefore, it is possible to improve the commercial value of the chicken thigh meat M while automating the process of removing the cartilage C attached to the deboned chicken thigh meat M.

A lifting step of lifting the attached matter H by the pair of gripping arms 11a and 11b is provided between the raising step and the cutting step. Therefore, the parts of the chicken thigh meat M other than the attached matter H gripped by the pair of gripping arms 11a and 11b will sag due to the own weight. As a result, it is possible to further suppress the meat around the attached matter H from remaining on the side of the attached matter H.

A gripping arm orientation adjusting step of adjusting the orientation of the pair of gripping arms 11a and 11b so that the ankle side of the chicken thigh meat M and the groin side of the chicken thigh meat M are located on both sides in the X direction (the gripping direction) between the pair of gripping arms 11a and 11b is provided before the pressing step. Therefore, the attached matter H can be easily gripped by the pair of gripping arms 11a and 11b.

In the gripping arm orientation adjusting step, the pair of gripping arms 11a and 11b are moved so that the distance L1 between the gripping arm body 33 of the first gripping arm 11a on the ankle side of the chicken thigh meat M and the center He of the attached matter H becomes shorter than the distance L2 between the gripping arm body 33 of the second gripping arm 11b on the groin side of the chicken thigh meat M and the center He of the attached matter H when viewed from the vertical direction (when viewed from the side opposite to the chicken thigh meat M with respect to the pair of gripping arms 11a and 11b). Therefore, it is possible to reliably raise the attached matter H from the chicken thigh meat M by these gripping arms 11a and 11b when gripping the attached matter H by the pair of gripping arms 11a and 11b.

In the above-described first embodiment, a case has been described in which the pressing block 16 is provided on the lower surface 15a of the base portion 15. A case has been described in which the pressing block 16 functions to prevent the chicken thigh meat M around the attached matter H from rising and the side surface 16a functions as the arm escape prevention portion that prevents the attached matter H from escaping from the base end side of the gripping arm body 33 when pressing the pair of gripping arms 11a and 11b against the chicken thigh meat M. However, the present invention is not limited thereto and the arm escape prevention portion may be provided separately from the pressing block 16.

In the above-described first embodiment, a case has been described in which the escape prevention plate 19 is provided in one leg 17 of two legs 17. However, the present invention is not limited thereto and a structure that prevents the uncut attached matter H from escaping when cutting the attached matter H by the circular blade body 6 of the cutter unit 3 may be used. For example, the leg 17 may be made to extend toward the cutter unit instead of providing the escape prevention plate 19.

Modified Example of First Embodiment

In the above-described first embodiment, a case has been described in which the horizontal bending arm portion 32 is formed on the base end side of each gripping arm body 33. Accordingly, a case has been described in which the horizontal bending arm portions are widened toward the side opposite to the cutter unit 3 from the base end of the gripping arm body 33 and the chicken thigh meat M at a part other than the attached matter H is prevented from being pinched by the pair of gripping arms 11a and 11b. However, the present invention is not limited thereto and each of the gripping arms 11a and 11b may have the following configuration.

Figure 12:
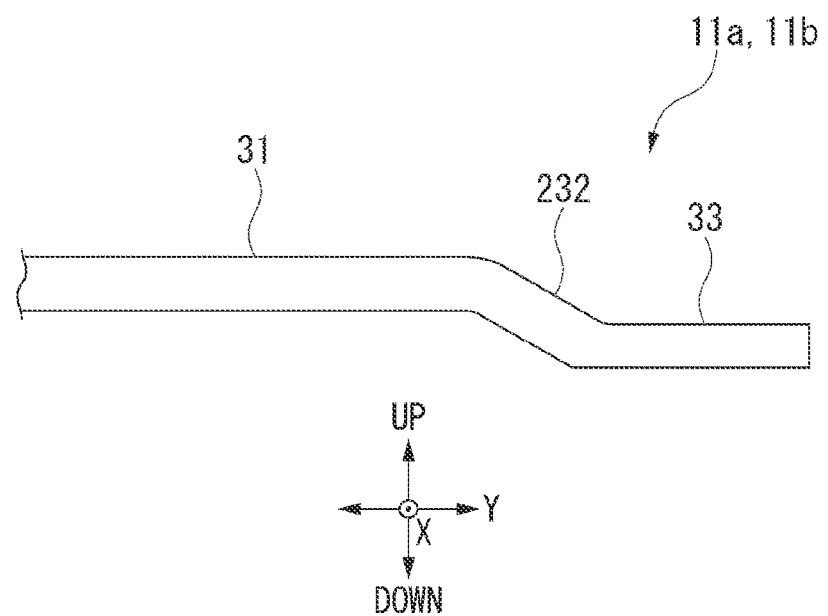
FIG. 12 is a schematic configuration diagram showing a modified example of the gripping arm of the first embodiment of the present invention.

FIG. 12 is a schematic configuration diagram showing a modified example of each of the gripping arms 11a and 11b. In the following description, aspects that are the same as those in the above-described embodiment will be indicated by the same reference numerals and the description thereof will be omitted.

As shown in FIG. 12, each of the gripping arms 11a and 11b may include a upward/downward bending arm portion 232 (an example of a crank portion in the claims) instead of the horizontal bending arm portion 32. The upward/downward bending arm portion 232 extends obliquely upward from the base end of the gripping arm body 33. That is, the vertical bending arm portion is bent and extended to separate from the belt conveyor B (the chicken thigh meat M) as it goes from the base end of the gripping arm body 33 toward the fixed arm portion 31.

With such a configuration, the base ends of the pair of gripping arms 11a and 11b can be separated from the chicken thigh meat M. Therefore, it is possible to prevent the chicken thigh meat M at a part other than the attached matter H from being pinched by these gripping arms 11a and 11b at the same time when the attached matter H is gripped by the pair of gripping arms 11a and 11b. Thus, the same effects as the above-described embodiment can be achieved.

Second Embodiment

Figure 13:
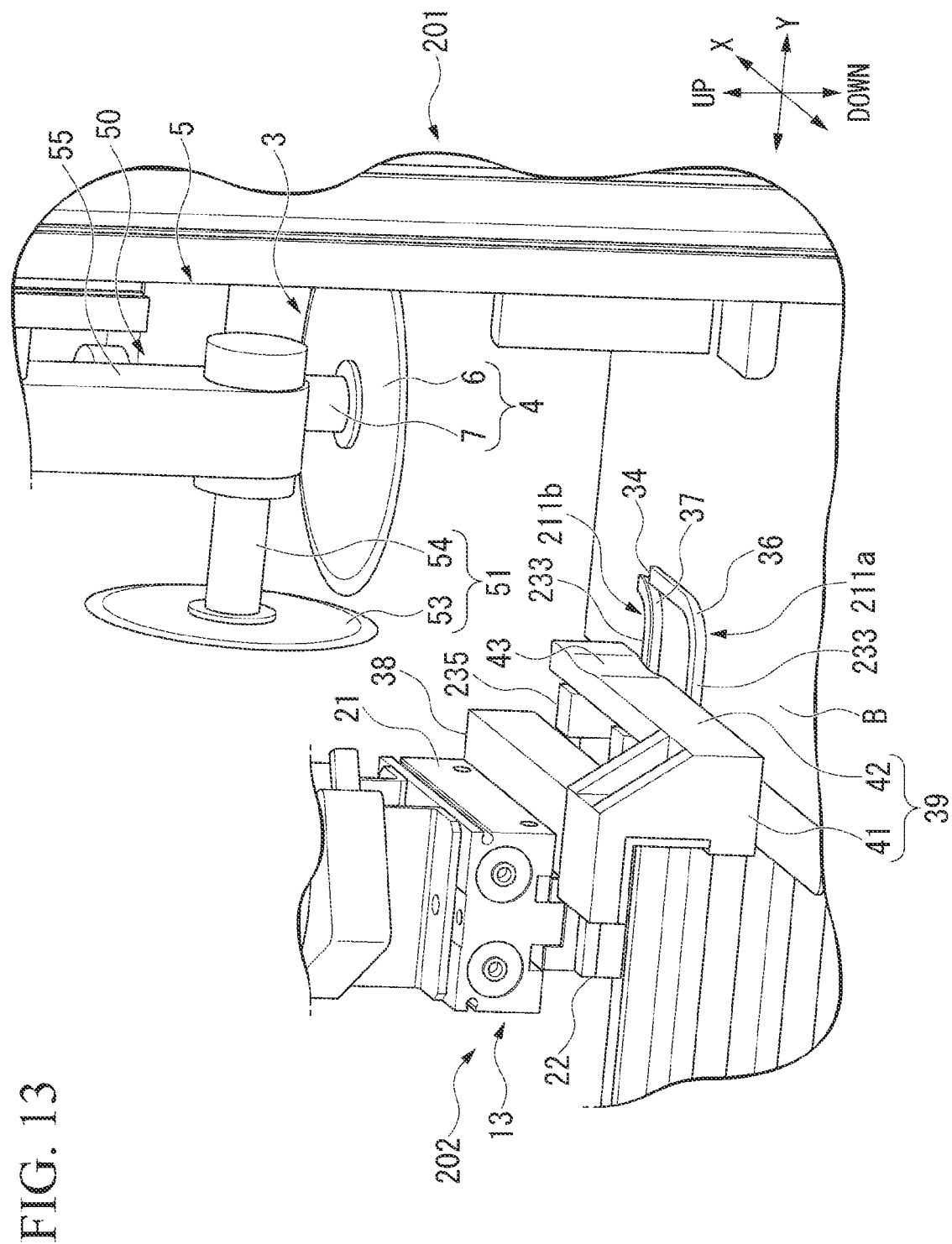
FIG. 13 is an oblique view of a meat-attached matter removal device of a second embodiment of the present invention.

Next, a second embodiment of the present invention will be described with reference to FIGS. 13 to 19. Aspects that are the same as those in the first embodiment will be indicated by the same reference numerals and the description thereof will be omitted. FIG. 13 is an oblique view of a meat-attached matter removal device 201 of the second embodiment.

As shown in FIG. 13, the meat-attached matter removal device 201 of the second embodiment is basically the same as that of the above-described first embodiment in that an attached matter raising unit 202 and the cutter unit 3 arranged above the belt conveyor B are provided.

The difference between the first embodiment and the second embodiment is that the configuration of the attached matter raising unit 2 of the first embodiment is different from the configuration of the attached matter raising unit 202 of the second embodiment. The difference between the first embodiment and the second embodiment is that the cutter unit 3 is provided as means for cutting the attached matter H in the first embodiment, while an auxiliary cutter unit 50 is provided in addition to the cutter unit 3 as means for cutting the attached matter H in the second embodiment. The cutter unit 3 of the second embodiment has an additional configuration. This will be described in detail below.

<Attached Matter Raising Unit>
<Gripping Arm>

Figure 14:
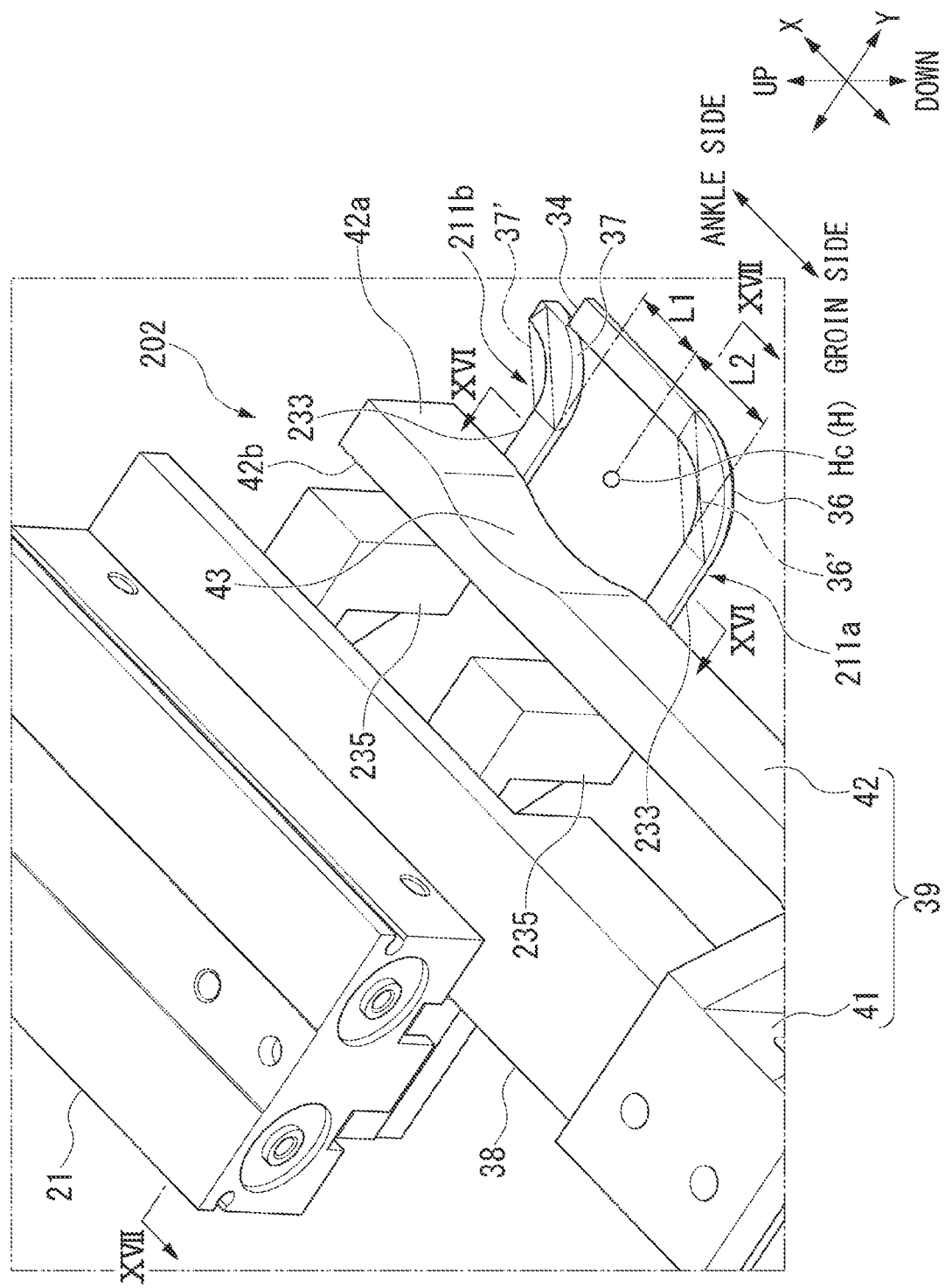
FIG. 14 is an oblique view of an attached matter raising unit provided with a gripping arm for a left leg of the second embodiment of the present invention.

FIG. 14 is an oblique view of the attached matter raising unit 202.

As shown in FIGS. 13 and 14, a pair of gripping arms 211a and 211b in the attached matter raising unit 202 include vertical bending arm portions 235. The vertical bending arm portion 235 extends along the vertical direction unlike the upward/downward bending arm portion 232 of the above-described modified example. A gripping arm body 233 extends in the Y direction from the lower end of the vertical bending arm portion 235.

In the first gripping arm 211a, a connecting portion 36 between the gripping arm body 233 and the falling prevention bar 34 is curved in an arc shape to protrude toward the side opposite to the second gripping arm 211b. An arcuate bent portion 37 is formed at the tip of the gripping arm body 233 of the second gripping arm 211b. The shape of the bent portion 37 follows the shape of the connecting portion 36.

Accordingly, when the pair of gripping arms 211a and 211b are closest to each other (in a closed state), the connecting portion 36 of the first gripping arm 211a and the bent portion 37 of the second gripping arm 211b overlap each other in the horizontal direction. When the pair of gripping arms 211a and 211b are closed, the bent portion 37 is along the connecting portion 36.

The direction in which the connecting portion 36 and the bent portion 37 protrude varies depending on whether the chicken thigh meat M is derived from the right leg or the left leg. More specifically, the connecting portion 36 and the bent portion 37 are curved so that the groin side of the chicken thigh meat M protrudes. That is, in the attached matter raising unit 202 shown in FIGS. 13 and 14, the groin side of the chicken thigh meat M is disposed on the side of the first gripping arm 211a.

The pair of gripping arms 211a and 211b shown in FIGS. 13 and 14 are used when the chicken thigh meat M is derived from left leg. In the following description, the pair of gripping arms 211a and 211b used when the chicken thigh meat M is derived from the left leg are referred to as the gripping arms 211a and 211b for the left leg. On the other hand, the pair of gripping arms 211a and 211b used when the chicken thigh meat M is derived from the right leg are referred to as the gripping arms 211a and 211b for the right leg.

The gripping arms 211a and 211b for the left leg have the same relationship of the distances L1 and L2 of the above-described first embodiment in the gripping arm orientation adjusting step. That is, in this second embodiment, the pair of gripping arms 211a and 211b are moved so that the distance L1 between the gripping arm body 233 of the second gripping arm 211b on the ankle side of the chicken thigh meat M and the center He of the attached matter H becomes shorter than the distance L2 between the gripping arm body 233 of the first gripping arm 211a on the groin side of the chicken thigh meat M and the center He of the attached matter H in the gripping arm orientation adjusting step.

Figure 15:
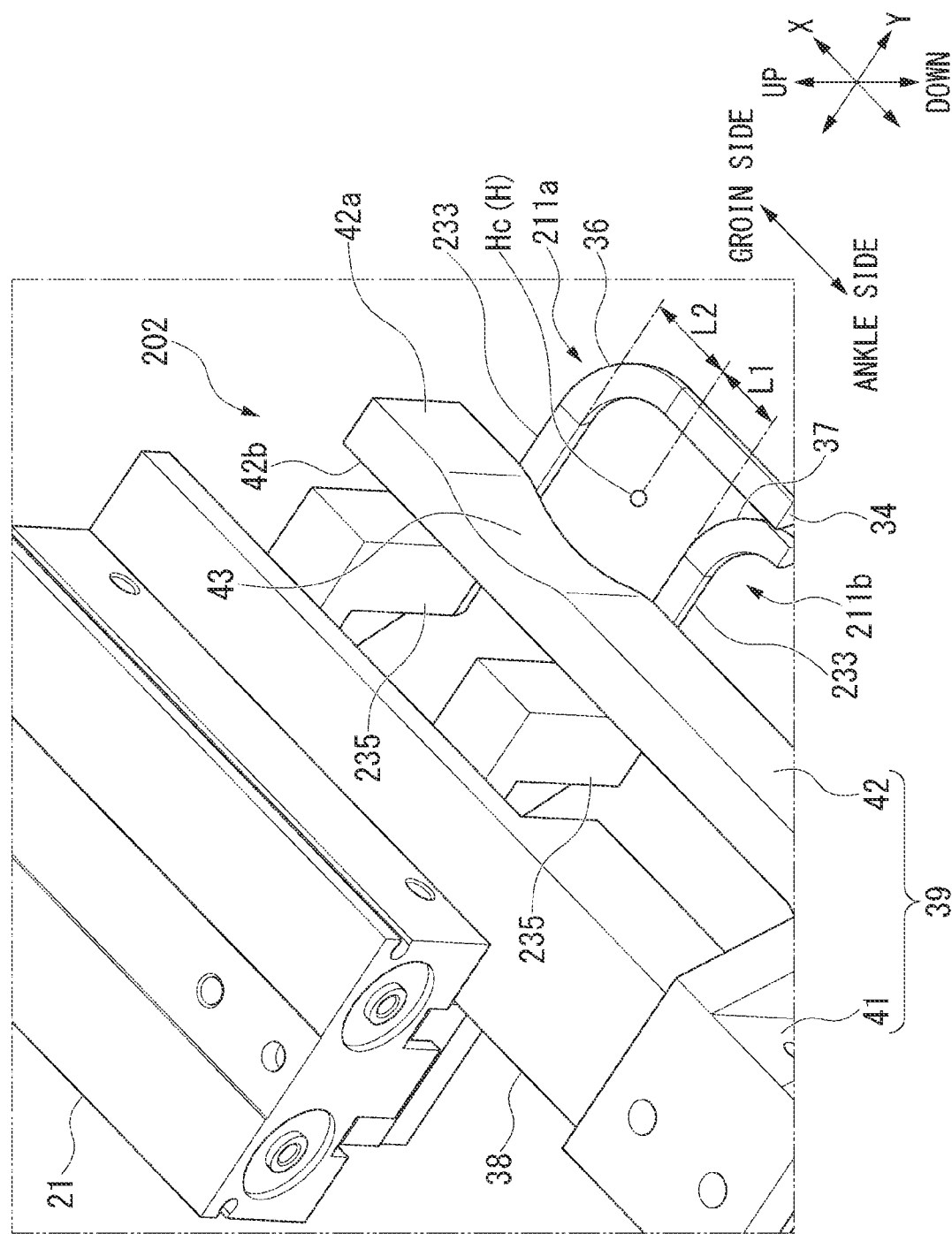
FIG. 15 is an oblique view of an attached matter raising unit provided with a gripping arm for a right leg of the second embodiment of the present invention.

FIG. 15 is an oblique view of the attached matter raising unit 202 provided with the gripping arms 211a and 211b for the right leg. FIG. 15 corresponds to FIG. 14 described above.

As shown in FIG. 15, the gripping arms 211a and 211b for the right leg are linearly symmetrical about the Y direction with respect to the gripping arms 211a and 211b for the left leg.

Even in this case, the groin side of the chicken thigh meat M is disposed on the side of the first gripping arm 211a. In the gripping arm orientation adjusting step, the pair of gripping arms 211a and 211b move so that the distance L1 between the gripping arm body 233 of the second gripping arm 211b on the ankle side of the chicken thigh meat M and the center He of the attached matter H becomes shorter than the distance L2 between the gripping arm body 233 of the first gripping arm 211a on the groin side of the chicken thigh meat M and the center He of the attached matter H.

The attached matter raising unit 202 provided with the gripping arms 211a and 211b for the left leg and the attached matter raising unit 202 provided with the gripping arms 211a and 211b for the right leg are the same in the other configurations. Therefore, hereinafter, each attached matter raising unit 202 will be simply described as the attached matter raising unit 202 without distinguishing them.

Figure 16:
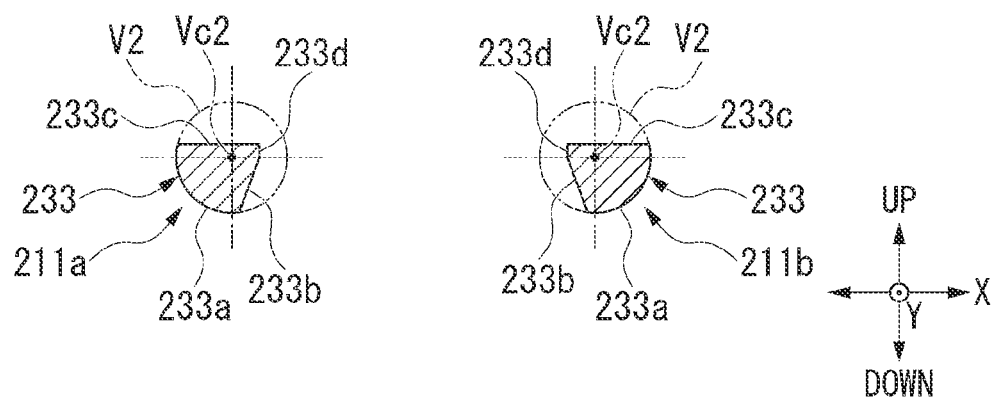
FIG. 16 is a cross-sectional view taken along a line XVI-XVI of FIG. 14.

FIG. 16 is a cross-sectional view taken along a line XVI-XVI of FIG. 14. FIG. 16 corresponds to FIG. 3 described above. The cross-sectional shape of each gripping arm body 233 in the vertical direction and the X direction is linearly symmetrical about the Y direction. Therefore, in the following description, only the gripping arm body 233 of the first gripping arm 211a will be described. The gripping arm body 233 of the second gripping arm 211b will be indicated by the same reference numerals as the first gripping arm 211a and the description thereof will be omitted.

As shown in FIG. 16, the gripping arm body 233 includes an arcuate surface (an example of a second arcuate surface in the claims) 233a, an inclined surface (an example of a second inclined surface in the claims) 233b and an upper wall surface (an example of a second upper wall surface in the claims) 233c which are connected to the arcuate surface 233a, and a vertical wall surface (an example of a second vertical wall surface in the claims) 233d which is provided to straddle the inclined surface 233b and the upper wall surface 233c in a cross-section along the vertical direction and the X direction.

The arcuate surface 233a is formed between the lower side (the arrangement side of the chicken thigh meat M) and the side opposite to the second gripping arm 211b (the side opposite to the mutually facing side of the gripping arms 211a and 211b).

The inclined surface 233b, the upper wall surface 233c, and the vertical wall surface 233d are formed by cutting out the virtual circle V2 including the arcuate surface 233a. That is, the inclined surface 233b is inclined toward the second gripping arm 211b as it goes upward from the end of the arcuate surface 233a on the side of the second gripping arm 211b. In other words, the inclined surface 233b is inclined so that the distance between the pair of gripping arm bodies 233 becomes short as it goes upward. The inclined surface 233b is located closer to the second gripping arm 211b than the center Vc2 of the virtual circle V2.

The upper wall surface 233c is located above the center Vc2 of the virtual circle V2. The upper wall surface 233c extends horizontally from the upper end of the arcuate surface 233a (the end on the side opposite to the second gripping arm 211b) toward the second gripping arm 211b. The upper wall surfaces 233c of the gripping arms 211a and 211b are located on the same plane.

The vertical wall surface 233d is located closer to the second gripping arm 211b than the center Vc2 of the virtual circle V2. The vertical wall surface 233d extends in the vertical direction from the end of the upper wall surface 233c on the side of the second gripping arm 211b to the upper end of the inclined surface 233b. The vertical wall surfaces 233d of the gripping arms 211a and 211b are parallel to each other.

In a cross-section along the vertical direction and the X direction of the gripping arm body 233, the length of the inclined surface 233b is longer than the length of the vertical wall surface 233d.

Figure 17:
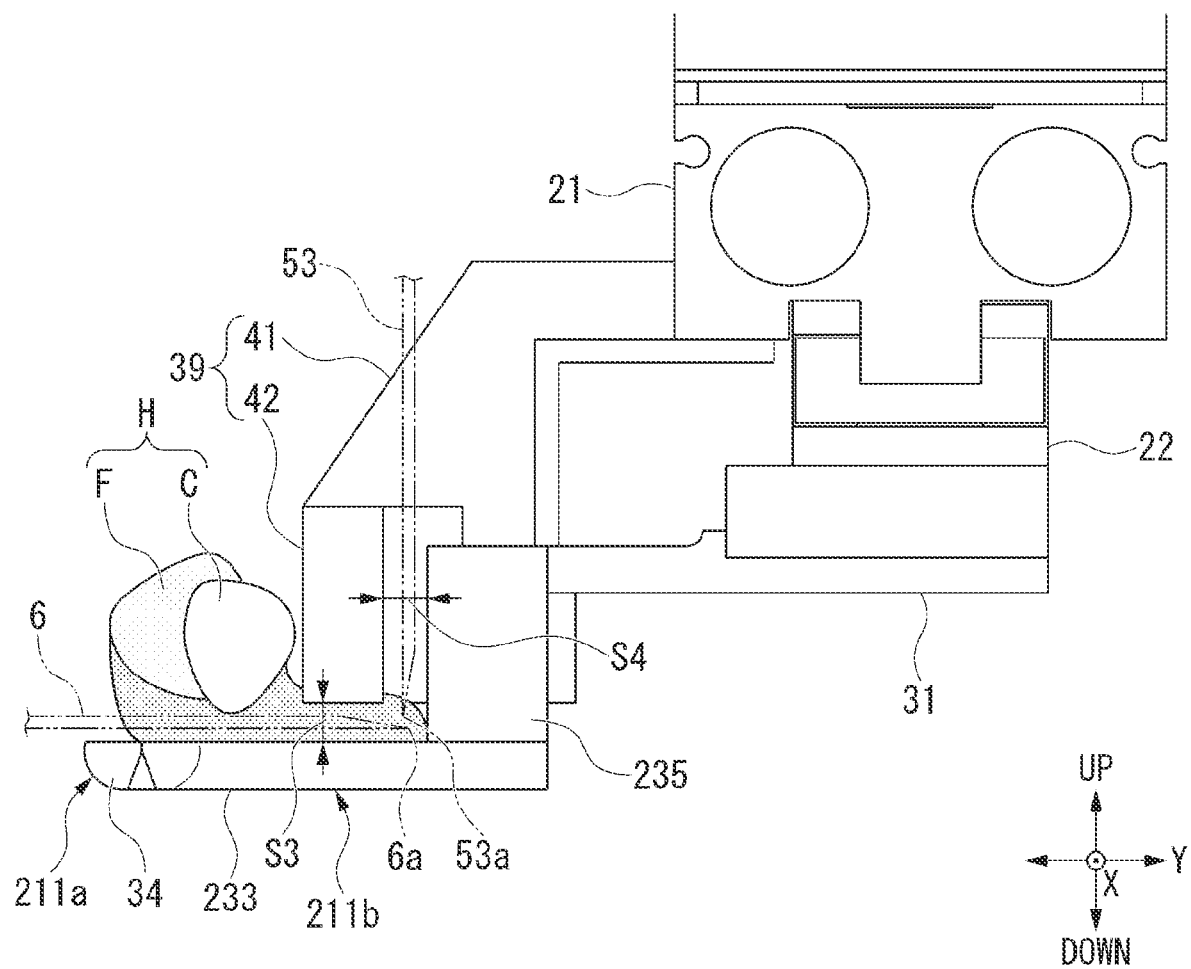
FIG. 17 is a cross-sectional view taken along a line XVII-XVII of FIG. 14.

FIG. 17 is a cross-sectional view taken along a line XVII-XVII of FIG. 14.

As shown in FIGS. 13, 14, and 17, in addition to the above, the attached matter raising unit 202 includes a rising prevention portion 39 which is fixed to the driving unit body 21 through the bracket 38. The rising prevention portion 39 includes a fixed block 41 which is fixed to one end side of the bracket 38 in the X direction and a plate-shaped rising prevention bar (an example of a rising prevention portion in the claims) 42 which extends from the fixed block 41 in the X direction.

The plate thickness direction of the rising prevention bar 42 matches the Y direction. The side (tip side) of the rising prevention bar 42 opposite to the bracket 38 is disposed above the gripping arm body 233. In other words, the tip side of the rising prevention bar 42 is disposed on the side of the gripping arm body 233 (the cutter unit 3) in relation to the vertical bending arm portion 235 in the pair of gripping arms 211a and 211b.

A concave portion 43 is formed in a part above the gripping arm body 233 in the rising prevention bar 42. The concave portion 43 is formed on a first side surface 42a on the side opposite to the vertical bending arm portion 235 in the rising prevention bar 42. The concave portion 43 is formed in an arc shape when viewed from the vertical direction.

A gap S3 through which the circular blade body 6 of the cutter unit 3 can pass is formed between such arising prevention bar 42 and the gripping arm body 233. A gap S4 through which an auxiliary circular blade body 53 (which will be described later) of the auxiliary cutter unit 50 can pass is formed between the rising prevention bar 42 and the vertical bending arm portion 235.

<Auxiliary Cutter Unit>

Figure 18:
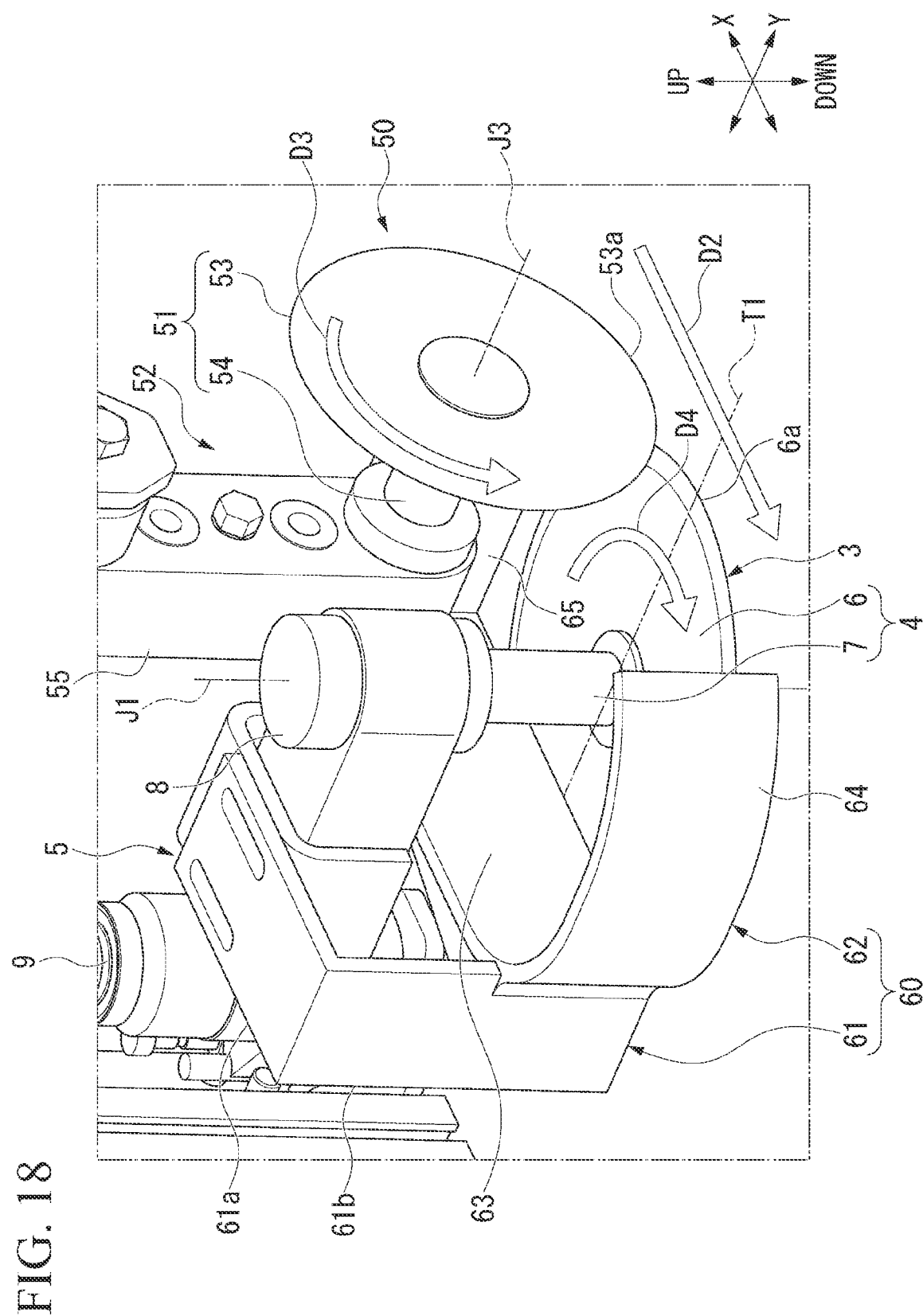
FIG. 18 is an oblique view of a cutter unit and an auxiliary cutter unit of the second embodiment of the present invention.

FIG. 18 is an oblique of the cutter unit 3 and the auxiliary cutter unit 50. In the following description, the passage direction D2 (see FIG. 18) to the cutter unit 3 (the circular blade body 6) of the pair of gripping arms 211a and 211b driven by the block driving unit 14 (see FIG. 1) is referred to as the passage direction D2 of the gripping arms 211a and 211b. In the second embodiment, the passage direction D2 of the gripping arms 211a and 211b is parallel to the X direction.

As shown in FIGS. 13, 17, and 18, the auxiliary cutter unit 50 is disposed on the upstream side of the cutter unit 3 in the passage direction D2 of the gripping arms 211a and 211b. The auxiliary cutter unit 50 includes an auxiliary circular blade 51 and an auxiliary cutter driving unit 52 which rotationally drives the auxiliary circular blade 51. The auxiliary circular blade 51 includes a disc-shaped auxiliary circular blade body 53 (an example of an auxiliary cutter in the claims) and a cutter shaft 54 which has one end fixed to the auxiliary circular blade body 53 and is disposed concentrically.

The auxiliary cutter driving unit 52 includes a shaft support portion 55 which rotatably supports the cutter shaft 54 and a cutter driving unit body (not shown) which is integrally provided with the shaft support portion 55. The cutter driving unit body includes a motor unit (not shown) and a transmission shaft which transmits the rotation of the motor unit to the cutter shaft 54. The cutter shaft 54 is rotated around a center axis J3 by the auxiliary cutter driving unit 52.

The center axis J3 of the cutter shaft 54 is orthogonal to the center axis J1 of the cutter unit 3. That is, the auxiliary circular blade body 53 is disposed to be orthogonal to the circular blade body 6. Apart located at the lowest end in the cutting edge of the auxiliary circular blade body 53 is disposed at a position overlapping the cutting edge of the circular blade body 6 in the X direction at the same height as the cutting edge of the circular blade body 6 when viewed from the X direction.

Apart located at the lowest end in the cutting edge of the auxiliary circular blade body 53 is a part for cutting the attached matter H. Hereinafter, this part is referred to as a cutting part 53a of the auxiliary circular blade body 53.

The rotation direction D3 of the auxiliary circular blade body 53 is a direction in which the rotation direction of the auxiliary circular blade body 53 at the cutting part 53a is opposite to the passage direction D2 of the gripping arms 211a and 211b.

<Cutter Unit>

A part for cutting the attached matter H in the circular blade body 6 of the cutter unit 3 is a part proximity to the cutting part of the auxiliary circular blade body 53. That is, this is a position overlapping the cutting part 53*a* of the auxiliary circular blade body 53 in the X direction. Hereinafter, this part is referred to as the cutting part 6*a* of the circular blade body 6.

In other words, the cutting part 6*a* of the circular blade body 6 is a part of the cutting edge of the circular blade body 6 located on a straight line T1 that passes through the center axis J1 of the cutter unit 3 and is parallel to the center axis J3 of the auxiliary cutter unit 50. The cutting part 6*a* of the circular blade body 6 is a part closest to the attached matter raising unit 202 on the straight line T1.

The rotation direction D4 of the circular blade body 6 is a direction in which the rotation direction of the circular blade body 6 at the cutting part 6*a* is the same as the passage direction D2 of the gripping arms 211*a* and 211*b*.

Figure 19:
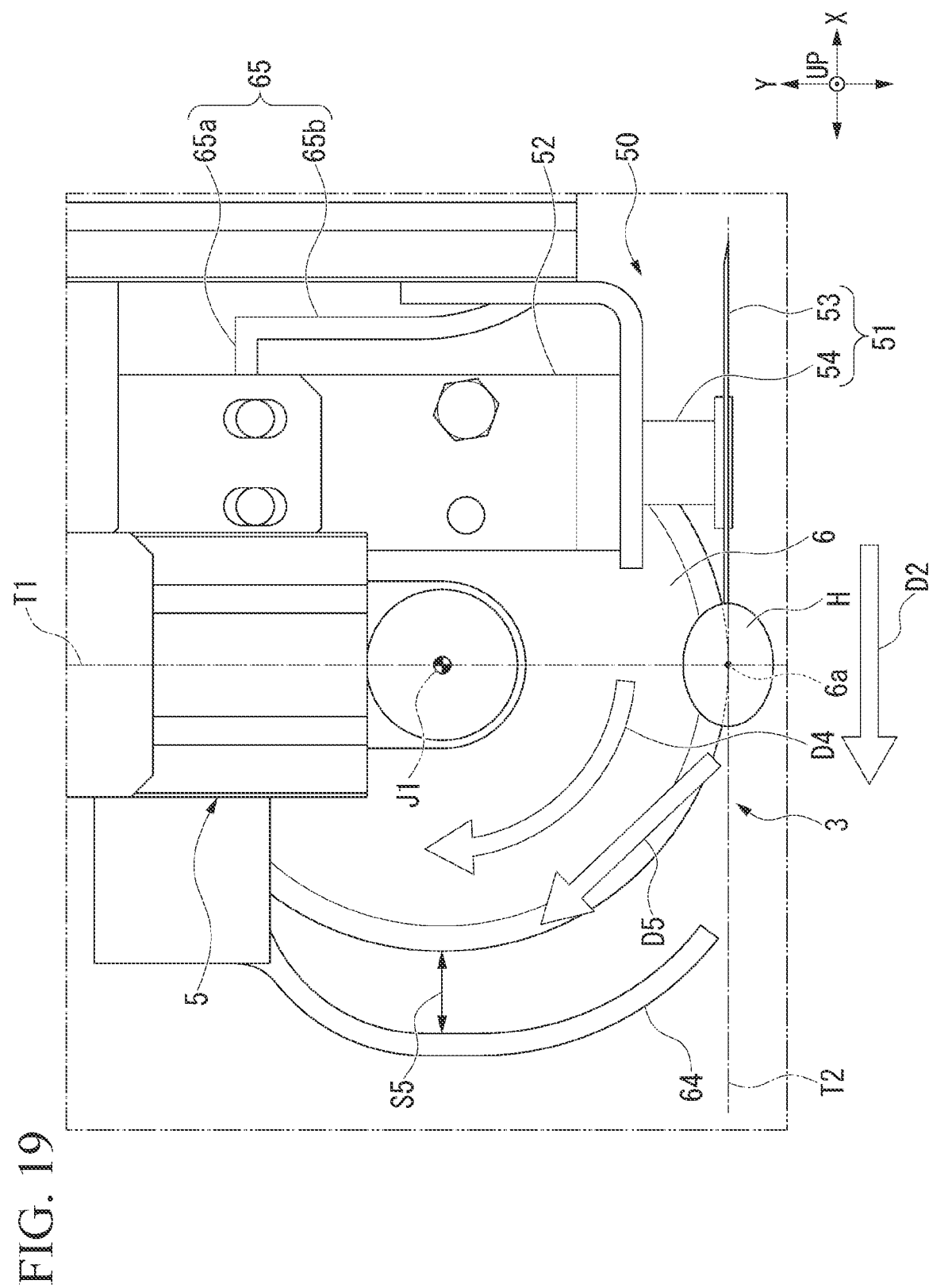
FIG. 19 is a top view of the cutter unit of the second embodiment of the present invention.

FIG. 19 is a plan view of the cutter unit 3.

As shown in FIGS. 18 and 19, a scattering prevention wall 60 is provided in the cutter unit 3 of the second embodiment. In FIGS. 13 and 17, the scattering prevention wall 60 is not shown for easy understanding of the description.

The scattering prevention wall 60 includes a bracket 61 which is fixed to the shaft support portion 8 and a cover body 62 which is supported by the bracket 61.

The bracket 61 is formed in an L shape. That is, the bracket 61 includes a horizontal wall 61*a* which extends from the upper surface of the shaft support portion 8 toward the side opposite to the auxiliary cutter unit 50 and a vertical wall 61*b* which is bent and extend downward from the end of the horizontal wall 61*a* on the side opposite to the auxiliary cutter unit 50. The cover body 62 is fixed to the lower portion of the vertical wall 61*b*.

The cover body 62 includes a plate-shaped base portion 63 which is provided on the circular blade body 6 to be located on the side opposite to the cutting part 6*a* of the circular blade body 6 compared to the cutter shaft 7. The base portion 63 is a plate-shaped member that is elongated in the X direction so that the plate thickness direction matches the Y direction. A first prevention wall 64 is integrally formed at the one end of the two ends of the base portion 63 in the X direction, which is located downstream of the passage direction D2 of the gripping arms 211*a* and 211*b*.

The first prevention wall 64 is a plate-shaped member that is formed in an arc shape to be located concentrically with the circular blade body 6 when viewed from the vertical direction. The first prevention wall 64 extends from the base portion 63 to a part closer to the base portion 63 than a straight line T2 (on the same plane as the auxiliary circular blade body 53) passing through the cutting part 6*a* of the circular blade body 6 in parallel to the X direction.

The rotation direction D4 of the circular blade body 6 is a direction in which the rotation direction of the circular blade body 6 at the cutting part 6*a* is the same as the passage direction D2 of the gripping arms 211*a* and 211*b*. Therefore, it can be said that the first prevention wall 64 extends to cover the downstream side of the cutting part 6*a* of the circular blade body 6 in the rotation direction D4 of the circular blade body 6.

A gap S5 through which the attached matter H removed from the chicken thigh meat M by the circular blade body 6 can pass is formed between the first prevention wall 64 and the circular blade body 6 when viewed from the vertical direction.

A second prevention wall 65 is integrally formed at the one end of the two ends of the base portion 63 in the X direction, which is located upstream of the passage direction D2 of the gripping arms 211*a* and 211*b*. The second prevention wall is a plate-shaped member that is formed in an L shape when viewed from the vertical direction. That is, the second prevention wall 65 includes a bottom wall 65*a* which extends from the base portion 63 and a side wall 65*b* which extends from the end of the bottom wall 65*a* on the side opposite to the base portion 63.

The bottom wall 65*a* extends from the base portion 63 toward the side opposite to the first prevention wall 64 in the X direction. The side wall 65*b* is bent and extended from the end of the bottom wall 65*a* on the side opposite to the base portion 63 toward the auxiliary circular blade body 53 in the Y direction. The tip side of the side wall 65*b* is curved toward the side opposite to the first prevention wall 64 as it goes toward the tip.

<Operation of Meat-Attached Matter Removal Device>

Next, the operation of the meat-attached matter removal device 201 will be described. In the following meat-attached matter removal device 201, the gripping arms 211*a* and 211*b* for the left leg or the gripping arms 211*a* and 211*b* for the right leg are used depending on whether the chicken thigh meat M is for the right leg or the left leg.

The operation of the meat-attached matter removal device 201 is the same as that of the meat-attached matter removal device 1 of the above-described first embodiment. That is, the attached matter H is cut from the chicken thigh meat M through the gripping arm orientation adjusting step, the pressing step, the raising step, and the lifting step, and the cutting step.

In the gripping arm orientation adjusting step, the groin side of the chicken thigh meat M is located on the side of the first gripping arm 211*a* and the ankle side of the chicken thigh meat M is located on the side of the second gripping arm 211*b*. In the gripping arm orientation adjusting step, the pair of gripping arms 211*a* and 211*b* are moved so that the distance L1 between the gripping arm body 233 of the second gripping arm 211*b* on the ankle side of the chicken thigh meat M and the center He of the attached matter H becomes shorter than the distance L2 between the gripping arm body 233 of the first gripping arm 211*a* on the groin side of the chicken thigh meat M and the center He of the attached matter H when viewed from the vertical direction. That is, a large space is ensured between the gripping arm body 233 of the first gripping arm 211*a* and the center He of the attached matter H.

In the pressing step, the rising prevention bar 42 prevents the chicken thigh meat M from rising at the side opposite to the falling prevention bar 34 with respect to the attached matter H (the base side of the gripping arm body 233). Since the concave portion 43 is formed in the rising prevention bar 42, it is possible to prevent the attached matter H from being pressed down by the rising prevention bar 42.

In the raising step, when the pair of gripping arms 211*a* and 211*b* are closed, the attached matter H is raised by each gripping arm body 233 so as to be pressed upward.

The connecting portion 36 is formed in the first gripping arm 211*a* of the pair of gripping arms 211*a* and 211*b*. The connecting portion 36 is curved in an arc shape so as to protrude toward the side opposite to the second gripping arm 211*b*. This shape follows along the shape of the attached matter H. Therefore, in the raising step, excess meat around the attached matter H is suppressed from being raised together with the attached matter H. Only the attached matter H can be raised by the pair of gripping arms 211a and 211b.

In the gripping arm bodies 233, the inclined surface 233b and the vertical wall surface 233d are formed on the side where these gripping arm bodies 233 approach each other. The upper wall surface 233c is formed on the upper portion of the gripping arm body 233. Therefore, when the gripping arm bodies 233 approach each other, it is possible to suppress excess meat from being pressed upward by the inclined surface 233b. Only the attached matter H is easily pressed upward through the vertical wall surface 233d. The attached matter H tends to ride on the upper wall surface 233c located below the upper edge of the virtual circle V2 by cutting out the virtual circle V2 (see FIG. 16).

The falling prevention bar 34 is integrally provided with the tip of the gripping arm body 233 in the first gripping arm 211a. Therefore, when the attached matter H is gripped by the pair of gripping arm bodies 233, the attached matter H is prevented from escaping from the tips of these gripping arm bodies 233.

The same can be said for the base end side of the gripping arm body 233. That is, the rising prevention bar 42 is provided on the base end side of the gripping arm body 233. The rising prevention bar 42 also functions as the arm escape prevention portion that prevents the attached matter H from escaping from the base end side of the gripping arm body 233.

As shown in FIGS. 17 and 18, in the cutting step, the circular blade 4 is rotated in advance by the cutter driving unit body 9 and the auxiliary circular blade 51 is rotated by the auxiliary cutter driving unit 52.

Subsequently, the block driving unit 14 (see FIG. 1) moves the pair of gripping arms 211a and 211b so that the circular blade body 6 of the circular blade 4 passes over the upper wall surface 233c of the gripping arm body 233. At this time, the auxiliary circular blade body 53 passes between the rising prevention bar 42 and the vertical bending arm portion 235.

An opening is formed on the side that receives the auxiliary circular blade 51 between the rising prevention bar 42 and the vertical bending arm portion 235. On the other hand, the fixed block 41 which supports the rising prevention bar 42 is disposed on the side opposite to the side that receives the auxiliary circular blade 51 between the rising prevention bar 42 and the vertical bending arm portion 235. Therefore, the auxiliary circular blade 51 smoothly passes between the rising prevention bar 42 and the vertical bending arm portion 235. The fixed block 41 does not prevent the auxiliary circular blade 51 from passing between the rising prevention bar 42 and the vertical bending arm portion 235.

The attached matter H passes between the circular blade body 6 and the auxiliary circular blade body 53. The auxiliary cutter unit 50 is disposed on the upstream side of the cutter unit 3 in the passage direction D2 of the gripping arms 211a and 211b. Therefore, an incision is made from above in the vicinity of the attached matter H of the chicken thigh meat M by the cutting part 53a of the auxiliary circular blade body 53 earlier than the circular blade body 6. Then, the base Hn of the attached matter H (see FIG. 7 and the like) is cut horizontally from the side of the cutter unit 3 by the cutting part 6a of the circular blade body 6.

In this way, the attached matter H is cut from both sides in the Y direction by the circular blade body 6 and the auxiliary circular blade body 53. It can be said that the auxiliary circular blade body 53 makes an incision on the side opposite to the cutting direction by the circular blade body 6 with respect to the attached matter H.

It can be said that the rising prevention bar 42 is arranged so that the auxiliary circular blade body 53 can pass close to the second side surface 42b which is opposite to the first side surface 42a. In other words, the second side surface 42b of the rising prevention bar 42 is a side surface on the side opposite to the incision side of the attached matter H by the circular blade body 6 on the rising prevention bar 42.

As shown in FIG. 19, the attached matter H is scattered by the rotation of the circular blade body 6 after the attached matter H is cut from the chicken thigh meat M. Specifically, the attached matter H is scattered toward the downstream side in the rotation direction D4 of the circular blade body 6 (see the arrow D5 in FIG. 19). The first prevention wall 64 is provided on the downstream side of the cutting part 6a of the circular blade body 6 in the rotation direction D4 of the circular blade body 6. Therefore, the attached matter H scattering from the circular blade body 6 hits the first prevention wall 64. A gap S5 through which the attached matter H can pass is formed between the first prevention wall 64 and the circular blade body 6. Thus, the attached matter H that hits the first prevention wall 64 is discharged downward from between the first prevention wall 64 and the circular blade body 6.

After the attached matter H is cut from the chicken thigh meat M, the block driving unit 14 retracts the pair of gripping arms 211a and 211b from the cutter unit 3 and the auxiliary cutter unit 50 in the horizontal direction. By returning the attached matter raising unit 202 to the standby posture, the operation of the meat-attached matter removal device 201 is completed.

In this way, in the above-described second embodiment, the same effects as the above-described first embodiment are achieved.

In addition, in the first gripping arm 211a, the connecting portion 36 between the gripping arm body 233 and the falling prevention bar 34 is curved in an arc shape to protrude toward the side opposite to the second gripping arm 211b. This shape follows the shape of the attached matter H. The arcuate bent portion 37 is formed at the tip of the gripping arm body 233 of the second gripping arm 211b. The shape of the bent portion 37 follows the shape of the connecting portion 36.

Therefore, it is possible to suppress an excess space from being formed between the pair of gripping arms 211a and 211b and the attached matter H. As a result, it is possible to raise only the attached matter H from the chicken thigh meat M by the pair of gripping arms 211a and 211b. By the pair of gripping arms 211a and 211b, it is possible to suppress excess meat around the attached matter H from rising upward together with the attached matter H.

The gripping arm body 233 includes the arcuate surface 233a, the inclined surface 233b and the upper wall surface 233c which are connected to the arcuate surface 233a, and the vertical wall surface 233d which is provided to straddle the inclined surface 233b and the upper wall surface 233c in a cross-section along the vertical direction and the X direction. Therefore, because of the arcuate surface 233a, it is possible to prevent the chicken thigh meat M from being damaged when pressing the pair of gripping arms 211a and 211b against the chicken thigh meat M.

When pinching (gripping) the attached matter H by the pair of gripping arms 211a and 211b, it is possible to easily and reliably raise the attached matter H onto the pair of gripping arms 211*a* and 211*b* by the inclined surface 233*b*, the upper wall surface 233*c*, and the vertical wall surface 233*d*.

The meat-attached matter removal device 201 includes the auxiliary cutter unit 50. The cutting direction of the auxiliary circular blade body 53 in the auxiliary cutter unit 50 is orthogonal to the cutting direction of the circular blade body 6 in the cutter unit 3. The auxiliary circular blade body 53 is disposed at a position in which the attached matter H is cut from the chicken thigh meat M by the auxiliary circular blade body 53 and the circular blade body 6 when the attached matter H passes between the auxiliary circular blade 53 and the circular blade body 6. Therefore, it is possible to reliably prevent the attached matter H from not being cut from the chicken thigh meat M by the circular blade body 6. That is, it is possible to reliably cut the attached matter H from the chicken thigh meat M by the auxiliary circular blade body 53.

The auxiliary cutter unit 50 is disposed on the upstream side of the cutter unit 3 in the passage direction D2 of the gripping arms 211*a* and 211*b*. Therefore, the auxiliary circular blade body 53 can make an incision from above in the vicinity of the attached matter H of the chicken thigh meat M earlier than the circular blade body 6. Then, the attached matter H can be cut from the chicken thigh meat M by the circular blade body 6. Thus, it is possible to more reliably remove the attached matter H from the chicken thigh meat M.

The meat-attached matter removal device 201 includes the rising prevention bar 42. The rising prevention bar 42 is disposed so that the auxiliary circular blade body 53 can pass close to the second side surface 42*b* opposite to the first side surface 42*a*. Therefore, it is possible to prevent the chicken thigh meat M from escaping from the auxiliary circular blade body 53 when the auxiliary circular blade body 53 makes an incision in the chicken thigh meat M. Thus, it is possible to prevent the auxiliary circular blade body 53 from making an insufficient incision in the chicken thigh meat M.

The meat-attached matter removal device 201 includes the scattering prevention wall 60. The scattering prevention wall 60 includes the first prevention wall 64 which extends to cover the downstream side of the cutting part 6*a* of the circular blade body 6 in the rotation direction D4 of the circular blade body 6. The gap S5 through which the attached matter H removed from the chicken thigh meat M by the circular blade body 6 can pass is formed between the first prevention wall 64 and the circular blade body 6. Therefore, the scattering prevention wall 60 (the first prevention wall 64) can prevent the scattering of the attached matter H due to the rotation of the circular blade body 6. It is possible to reliably discharge the attached matter H downward from between the first prevention wall 64 and the circular blade body 6.

In the cutting step, two cutters, that is, the circular blade body 6 and the auxiliary circular blade body 53 make an incision in the chicken thigh meat M. Therefore, it is possible to reliably remove the attached matter H from the chicken thigh meat M.

In the above-described second embodiment, a case has been described in which the connecting portion 36 of the first gripping arm 211*a* is curved in an arc shape to protrude toward the side opposite to the second gripping arm 211*b*. A case has been described in which the arcuate bent portion 37 is formed at the tip of the gripping arm body 233 in the second gripping arm 211*b*. However, the present invention is not limited thereto and the connecting portion 36 may be formed to follow the shape of the attached matter H. The tip of the gripping arm body 233 in the second gripping arm 211*b* may be curved to match the shape of the connecting portion 36 so that the tip of the gripping arm body overlaps the connecting portion 36 and follows the connecting portion 36 when the pair of gripping arms 211*a* and 211*b* are closed.

For example, the connecting portion 36 may be formed in a linear shape so as to straddle the gripping arm body 233 and the falling prevention bar 34 and so as to be inclined with respect to the extension direction of the gripping arm body 233 (the first gripping arm 211*a*) and the extension direction of the falling prevention bar 34 (see a connecting portion 36' in FIG. 14). A bent portion 37' corresponding to the connecting portion 36' may be formed at the tip of the gripping arm body 233.

In the above-described second embodiment, a case has been described in which the auxiliary cutter unit 50 is disposed so that the cutting direction of the auxiliary circular blade body 53 is orthogonal to the cutting direction of the circular blade body 6. However, the present invention is not limited thereto and the auxiliary cutter unit 50 may be disposed at a position in which the attached matter H passes between the auxiliary cutter unit 50 and the circular blade body 6 so that the attached matter H can be cut from the chicken thigh meat M by the circular blade body 6 and the auxiliary circular blade body 53. It is desirable that the cutting direction of the circular blade body 6 intersects the cutting direction of the auxiliary circular blade body 53. With such a configuration, it is possible to efficiently arrange the cutter unit 3 and the auxiliary cutter unit 50 in a space-saving manner.

In the above-described second embodiment, a case has been described in which the cover body 62 of the scattering prevention wall 60 is formed by integrally molding the base portion 63, the first prevention wall 64, and the second prevention wall 65. However, the present invention is not limited thereto and the cover body 62 may include at least the first prevention wall 64. With such a configuration, the same effects as the above-described second embodiment can be achieved.

The present invention is not limited to the above-described embodiments and includes various modifications to the above-described embodiment without departing from the scope of the present invention.

In the above-described embodiments, a case has been described in which the attached matter raising unit 2 and the cutter unit 3 are arranged above the belt conveyor B and the attached matter H of the chicken thigh meat M conveyed by the belt conveyor B is removed. However, the present invention is not limited thereto and a fixed meat processing table may be used instead of the belt conveyor B. In this case, the posture of the chicken thigh meat M placed on the meat processing table may be detected by a camera (not shown) and the meat-attached matter removal device 1 may be operated on the basis of the detection result.

In the above-described embodiments, a case has been described in which the block driving unit 14 is a multi-joint robot. A case has been described in which the block driving unit 14 operates the movable block 12 in the vertical direction, the inclined vertical direction, and the horizontal direction. A case has been described in which the block driving unit 14 rotates the movable block 12 around the center axis J2 parallel to the vertical direction. A case has been described in which the attached matter H is raised from the chicken thigh meat M by the pair of gripping arms 11*a* and 11*b* or the pair of gripping arms 211*a* and 211*b* and then the pair of gripping arms 11*a* and 11*b* or the pair of gripping arms 211a and 211b are moved toward the circular blade body 6 to cut the base Hn of the attached matter H.

However, the present invention is not limited thereto and the block driving unit 14 may have a function as the contact/separation driving unit that allows at least the pair of gripping arms 11a and 11b or the pair of gripping arms 211a and 211b to approach and separate from the chicken thigh meat M. In this case, the contact/separation driving unit may be configured to move the cutter unit 3 or the auxiliary cutter unit 50 toward the pair of gripping arms 11a and 11b or the pair of gripping arms 211a and 211b.

Desirably, the block driving unit 14 may have a function as the rotation driving unit that rotates the pair of gripping arms 11a and 11b or the pair of gripping arms 211a and 211b around the center axis J2. With such a configuration, since the pair of gripping arms 11a and 11b or the pair of gripping arms 211a and 211b can be oriented in a desired direction with respect to the chicken leg meat M, the attached matter H can be easily raised from the chicken thigh meat M by the pair of gripping arms 11a and 11b or the pair of gripping arms 211a and 211b.

In the above-described embodiments, a case has been described in which the falling prevention bar 34 is integrally provided with the tips of the gripping arm bodies 33 and 233 of the first gripping arms 11a and 211a, respectively. However, the present invention is not limited thereto and the attached matter H may be prevented from escaping from the tips of these gripping arm bodies 33 and 233 when the attached matter H is gripped by the pair of gripping arm bodies 33 and 233, respectively.

For example, in the above-described first embodiment, the falling prevention bar 34 may be provided at the tip of the gripping arm body 33 in the second gripping arm 11b. A convex portion having a shorter protruding length than the falling prevention bar 34 may be provided instead of the rod like the falling prevention bar 34.

In the above-described embodiments, a case has been described in which the meat-attached matter removal devices 1 and 201 are used to remove the attached matter H attached to the chicken thigh meat M. However, the present invention is not limited thereto and the meat-attached matter removal devices 1 and 201 can be used to remove various attached matters such as bone fragments attached to the chicken thigh meat M in addition to the attached matter H. The configuration of the meat-attached matter removal devices 1 and 201 can be adopted to remove the attached matter attached to the various meat other than the chicken thigh meat M.

INDUSTRIAL APPLICABILITY

According to the meat-attached matter removal device and the meat-attached matter removal method described above, it is possible to suppress as much as possible the meat around the attached matter from remaining on the side of the attached matter when removing the attached matter from the meat by the cutter. Therefore, it is possible to improve the commercial value of the meat while automating the process of removing the attached matter attached to the deboned meat.

REFERENCE SIGNS LIST 1, 201 Meat-attached matter removal device
2, 202 Attached matter raising unit
3 Cutter unit
6 Circular blade body (cutter)
10 Arm driving unit (driving unit)
11a, 211a First gripping arm (gripping arm)
11b, 211b Second gripping arm (gripping arm)
12 Movable block
13 Arm opening/closing driving unit (opening/closing driving unit)
14 Block driving unit (contact/separation driving unit, rotation driving unit)
16 Pressing block (arm escape prevention portion)
16a Side surface of pressing block (arm escape prevention portion)
19 Escape prevention plate (cutter escape prevention portion)
31 Fixed arm portion
32 Horizontal bending arm portion (widening portion)
33, 233 Gripping arm body (gripping arm)
33a Arcuate surface (first arcuate surface)
33b Vertical wall surface (first vertical wall surface)
33c Upper wall surface (first upper wall surface)
33d Inclined surface (first inclined surface)
34 Falling prevention bar (convex portion)
36 Connecting portion
37 Bent portion
39 Rising prevention portion
42 Rising prevention bar (rising prevention portion)
50 Auxiliary cutter unit
53 Auxiliary circular blade body (auxiliary cutter)
60 Scattering prevention wall
64 First prevention wall (scattering prevention wall)
232 Upward/downward bending arm portion (crank portion)
233a Arcuate surface (second arcuate surface)
233b Inclined surface (second inclined surface)
233c Upper wall surface (second upper wall surface)
233d Vertical wall surface (second vertical wall surface)
C Cartilage (attached matter)
F Fat body (attached matter)
Hn Base
H Attached matter
J2 Center axis
M Chicken thigh meat (meat)

The invention claimed is:

1. A meat-attached matter removal device comprising:
a pair of gripping arms that is configured to grip an attached matter, which is attached to a deboned meat, from both sides of the attached matter and from a base of the attached matter at a side of the meat and that is configured to raise the attached matter from the meat;
a driving unit configured to drive the pair of gripping arms; and
a cutter that passes over the pair of gripping arms and that is configured to cut the attached matter raised by the pair of gripping arms from the base of the attached matter at the side of the meat.

2. The meat-attached matter removal device according to claim 1, wherein the driving unit includes:
a contact/separation driving unit configured to make the pair of gripping arms to approach and separate from the meat; and
an opening/closing driving unit configured to perform an open and close movement of the pair of gripping arms by approaching and separating the pair of gripping arms from each other.

3. The meat-attached matter removal device according to claim 2, wherein the driving unit further includes a rotation driving unit configured to rotate the pair of gripping arms around a center axis which is a direction in which the pair of gripping arms approach and separate with respect to the meat.

4. The meat-attached matter removal device according to claim 1, wherein
the pair of gripping arms extend from the driving unit in a direction intersecting a gripping direction, and
at least one of the pair of gripping arms is provided with a convex portion which is provided at a tip of the gripping arm so as to prevent a gripping mistake of the attached matter by the gripping arms.

5. The meat-attached matter removal device according to claim 4, wherein
the convex portion is provided in a first gripping arm which is one of the pair of gripping arms and extends in the gripping direction from a tip of the first gripping arm toward a second gripping arm which is other one of the pair of gripping arms,
a connecting portion between the first gripping arm and the convex portion is curved along a shape of the attached matter, and
a tip of the second gripping arm is curved along a shape of the connecting portion so that the tip of the second gripping arm overlaps the connecting portion in an approach/separation direction of the pair of gripping arms and follows the connecting portion in a state the pair of gripping arms have approached with each other.

6. The meat-attached matter removal device according to claim 5, wherein the connecting portion is formed in a linear shape so as to straddle the first gripping arm and the convex portion and is formed so as to incline with respect to an extension direction of the first gripping arm and an extension direction of the convex portion.

7. The meat-attached matter removal device according to claim 5, wherein
the meat is a chicken thigh meat and the attached matter is a cartilage and a fat body attached to the cartilage,
the pair of gripping arms are arranged so that the pair of gripping arms is located between an ankle side of the chicken thigh meat and a groin side of the chicken thigh meat which are located on both sides in the gripping direction, and
the connecting portion is curved so that a side closer to the groin side of the chicken thigh meat protrudes.

8. The meat-attached matter removal device according to claim 1, wherein
the pair of gripping arms extend from the driving unit in a direction intersecting a gripping direction, and
the meat-attached matter removal device further comprises an arm escape prevention portion that is provided at a side of a base end of the gripping arm and that is configured to prevent an escape of the attached matter from the base end of the gripping arm.

9. The meat-attached matter removal device according to claim 1, wherein
the pair of gripping arms extend from the driving unit in a direction intersecting a gripping direction, and
at least one of the pair of gripping arms is provided with a cutter escape prevention portion that is arranged with a gap on a side opposite to a side of the gripping arm in which the meat is disposed and that is configured to prevent an escape of the attached matter from the cutter when cutting the attached matter from the meat.

10. The meat-attached matter removal device according to claim 1, wherein
the pair of gripping arms extend from the driving unit in a direction intersecting a gripping direction, and widening portions are formed at base ends of the pair of gripping arms so that a gap between the pair of gripping arms becomes wider towards outer side in a longitudinal direction of the gripping arm.

11. The meat-attached matter removal device according to claim 1, wherein
the pair of gripping arms extend from the driving unit in a direction intersecting a gripping direction, and
crank portions, which is bent so as to be separated toward a side opposite to a side the meat is placed, are provided at base ends of the pair of gripping arms.

12. The meat-attached matter removal device according to claim 1, wherein
the pair of gripping arms extend from the driving unit in a direction intersecting a gripping direction, and
a cross-sectional shape of the pair of gripping arms in a shorter side direction includes:
a first arcuate surface formed between a meat arrangement side and a side opposite to a mutually facing side of the pair of gripping arms;
a first vertical wall surface extending from an end of the first arcuate surface at the mutually facing side of the pair of gripping arms toward a side opposite to the meat arrangement side;
a first upper wall surface extending from an end of the first arcuate surface at a side opposite to the meat arrangement side toward the mutually facing side of the pair of gripping arms; and
a first inclined surface connecting the first vertical wall surface and the first upper wall surface and inclined so that a distance between the pair of gripping arms becomes shorter as it goes from the first upper wall surface toward the first vertical wall surface.

13. The meat-attached matter removal device according to claim 1, wherein
the pair of gripping arms extend from the driving unit in a direction intersecting a gripping direction,
a cross-sectional shape of the pair of gripping arms in a shorter side direction includes:
a second arcuate surface formed between a meat arrangement side and a side opposite to a mutually facing side of the pair of gripping arms;
a second inclined surface extending from an end of the second arcuate surface at the mutually facing side of the pair of gripping arms toward a side opposite to the meat arrangement side;
a second upper wall surface extending from an end of the second arcuate surface at a side opposite to the meat arrangement side toward the mutually facing side of the pair of gripping arms; and
a second vertical wall surface connecting the second inclined surface and the second upper wall surface,
each of the second inclined surface is inclined so that a distance between the pair of gripping arms becomes shorter as it goes from an end of the second arcuate surface toward an end of the second vertical wall surface, and
in a cross-sectional shape of the pair of gripping arms in the shorter side direction, a length of the second inclined surface is longer than a length of the second vertical wall surface.

14. The meat-attached matter removal device according to claim 1, further comprising:
an auxiliary cutter configured to cut the attached matter from the meat, wherein
a cutting direction of the auxiliary cutter intersects a cutting direction of the cutter, and the auxiliary cutter is disposed at a position in which the attached matter is cut from the meat by the auxiliary cutter and the cutter while the attached matter passes through between the auxiliary cutter and the cutter.

15. The meat-attached matter removal device according to claim 14, wherein the auxiliary cutter is disposed at a position in which the auxiliary cutter cuts the attached matter from the meat earlier than the cutter.

16. The meat-attached matter removal device according to claim 14, further comprising:
   a rising prevention portion configured to prevent a part in the attached matter raised by the pair of gripping arms and which will be cut by the auxiliary cutter from rising, wherein
   the rising prevention portion is arranged so that the cutter is able to pass between the gripping arm and the rising prevention portion and so that the auxiliary cutter is able to pass close to a side surface of the rising prevention portion opposite to a side in which the cutter cuts into the meat.

17. A meat-attached matter removal method of removing the attached matter from the meat using the meat-attached matter removal device according to claim 14, comprising:
   a pressing step of pressing the pair of gripping arms against the meat from both sides of the attached matter so that a constant pressure is applied to the meat;
   a raising step of gripping the base of the attached matter at the side of the meat and raises the attached matter from the meat by the pair of gripping arms, after the pressing step; and
   a cutting step of cutting the attached matter from the base of the attached matter at the side of the meat by the cutter and the auxiliary cutter, after the raising step.

18. The meat-attached matter removal device according to claim 1, wherein
   the cutter includes a circular blade cutter which rotates around a cutter axis,
   the meat-attached matter removal device further comprises a scattering prevention wall that is provided on a downstream side of a cutting position of the cutter with respect to the meat in a rotation direction of the cutter and that is configured to prevent the attached matter from scattering, and
   the scattering prevention wall is disposed to form a gap between the scattering prevention wall and the cutter so that the attached matter falls.

19. The meat-attached matter removal device according to claim 1, wherein the attached matter is a cartilage and a fat body attached to the cartilage.

20. A meat-attached matter removal method of removing the attached matter from the meat using the meat-attached matter removal device according to claim 1, comprising:
   a pressing step of pressing the pair of gripping arms against the meat from both sides of the attached matter so that a constant pressure is applied to the meat;
   a raising step of gripping the base of the attached matter at the side of the meat and raises the attached matter from the meat by the pair of gripping arms, after the pressing step; and
   a cutting step of cutting the attached matter from the base of the attached matter at the side of the meat by the cutter, after the raising step.

21. The meat-attached matter removal method according to claim 20, further comprising:
   a lifting step of lifting the attached matter by the pair of gripping arms between the raising step and the cutting step.

22. The meat-attached matter removal method according to claim 20, wherein
   the pair of gripping arms extend from the driving unit in a direction intersecting a gripping direction,
   the meat is a chicken thigh meat and the attached matter is a cartilage and a fat body attached to the cartilage, and
   the meat-attached matter removal method further comprises:
      a gripping arm orientation adjusting step of adjusting an orientation of the pair of gripping arms so that the pair of gripping arms is located between an ankle side of the chicken thigh meat and a groin side of the chicken thigh meat which are located on both sides in the gripping direction between the pair of gripping arms, before the pressing step.

23. The meat-attached matter removal method according to claim 22, wherein, in the gripping arm orientation adjusting step, a distance between the attached matter and the gripping arm located on the ankle side of the chicken thigh meat among the pair of gripping arms is shorter than a distance between the attached matter and the gripping arm located on the groin side of the chicken thigh meat among the pair of gripping arms when viewed from a side opposite to the chicken thigh meat with respect to the pair of gripping arms.

* * * * *